US010106875B2

(12) United States Patent
Takagi et al.

(10) Patent No.: US 10,106,875 B2
(45) Date of Patent: Oct. 23, 2018

(54) STEEL MATERIAL, HYDROGEN CONTAINER, METHOD FOR PRODUCING THE STEEL MATERIAL, AND METHOD FOR PRODUCING THE HYDROGEN CONTAINER

(71) Applicant: JFE STEEL CORPORATION, Tokyo (JP)

(72) Inventors: Shusaku Takagi, Tokyo (JP); Akihide Nagao, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 426 days.

(21) Appl. No.: 14/780,642

(22) PCT Filed: Mar. 28, 2014

(86) PCT No.: PCT/JP2014/001832
§ 371 (c)(1),
(2) Date: Sep. 28, 2015

(87) PCT Pub. No.: WO2014/156187
PCT Pub. Date: Oct. 2, 2014

(65) Prior Publication Data
US 2016/0053355 A1 Feb. 25, 2016

(30) Foreign Application Priority Data

Mar. 29, 2013 (JP) ................ 2013-074654
Mar. 29, 2013 (JP) ................ 2013-074655

(51) Int. Cl.
| C22C 38/60 | (2006.01) |
|---|---|
| C22C 38/00 | (2006.01) |
| C22C 38/38 | (2006.01) |
| C21D 9/46 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C22C 38/20 | (2006.01) |
| C22C 38/22 | (2006.01) |
| C22C 38/24 | (2006.01) |
| C22C 38/26 | (2006.01) |

(Continued)

(52) U.S. Cl.
CPC .............. *C22C 38/60* (2013.01); *C21D 6/001* (2013.01); *C21D 6/002* (2013.01); *C21D 6/004* (2013.01); *C21D 6/005* (2013.01); *C21D 6/008* (2013.01); *C21D 8/005* (2013.01); *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/42* (2013.01); *C22C 38/44* (2013.01); *C22C 38/48* (2013.01); *C22C 38/50* (2013.01); *C22C 38/54* (2013.01); *C23F 1/28* (2013.01); *C21D 9/14* (2013.01); *C21D 2211/004* (2013.01); *C21D 2211/008* (2013.01)

(58) Field of Classification Search
None
See application file for complete search history.

(56) References Cited

U.S. PATENT DOCUMENTS 5,779,822 A * 7/1998 Aono ................ C21D 6/004
148/404
8,313,589 B2 11/2012 Takasawa
(Continued)

FOREIGN PATENT DOCUMENTS

| EP | 2540854 A1 | 1/2013 |
|---|---|---|
| EP | 2692890 | 2/2014 |

(Continued)

OTHER PUBLICATIONS

Korean Notice of Allowance for Korean Application No. 10-2015-7026339, with English translation, dated Feb. 16, 2017, 2 pages.
(Continued)

*Primary Examiner* — Colleen P Dunn
*Assistant Examiner* — Rajinder Bajwa
(74) *Attorney, Agent, or Firm* — RatnerPrestia

(57) ABSTRACT

A steel material includes: a composition containing, by mass, C: 0.05% to 0.60%, Si: 0.01% to 2.0%, Mn: 0.3% to 3.0%, P: 0.001% to 0.040%, S: 0.0001% to 0.010%, N: 0.0001% to 0.0060%, Al: 0.01% to 1.5%, one or more elements selected from Ti: 0.01% to 0.20%, Nb: 0.01% to 0.20%, and V: 0.01% or more and less than 0.05%, and one or more elements selected from B: 0.0001% to 0.01%, Mo: 0.005% to 2.0%, and Cr: 0.005% to 3.0%, with the balance being Fe and inevitable impurities; and a steel microstructure that includes 95% or more of tempered martensite on a volume fraction basis, that includes a precipitate having a diameter of 100 nm or less and including one or more elements selected from Ti, Nb, and V and one or more elements selected from carbon and nitrogen at a density of 50 particles/$\mu m^2$ or more, and that includes prior austenite having a grain diameter of 3 μm or more.

8 Claims, No Drawings

(51) Int. Cl.

| | | |
|---|---|---|
| *C22C 38/28* | (2006.01) | |
| *C22C 38/32* | (2006.01) | |
| *C22C 38/44* | (2006.01) | |
| *C22C 38/50* | (2006.01) | |
| *C22C 38/54* | (2006.01) | |
| *C21D 6/00* | (2006.01) | |
| *C21D 8/00* | (2006.01) | |
| *C22C 38/08* | (2006.01) | |
| *C22C 38/16* | (2006.01) | |
| *C22C 38/42* | (2006.01) | |
| *C22C 38/48* | (2006.01) | |
| *C23F 1/28* | (2006.01) | |
| *C21D 9/14* | (2006.01) | |

(56) References Cited

U.S. PATENT DOCUMENTS

| | | | |
|---|---|---|---|
| 8,663,400 B2 | 3/2014 | Omura | |
| 8,876,986 B2 | 11/2014 | Hata | |
| 8,962,149 B2 | 2/2015 | Oikawa | |
| 8,974,612 B2 | 3/2015 | Takasawa | |
| 2012/0009434 A1* | 1/2012 | Hata | C21D 6/008 428/577 |
| 2013/0213534 A1* | 8/2013 | Hikita | C21D 8/005 148/654 |
| 2014/0090755 A1* | 4/2014 | Ueda | C22C 38/02 148/645 |
| 2014/0096875 A1 | 4/2014 | Ueda | |
| 2015/0368742 A1* | 12/2015 | Shibata | C21D 1/84 148/652 |

FOREIGN PATENT DOCUMENTS

| | | |
|---|---|---|
| EP | 2695960 | 2/2014 |
| JP | 2005002386 | 1/2005 |
| JP | 2007270293 | 10/2007 |
| JP | 2007302974 | 11/2007 |
| JP | 2009046737 | 3/2009 |
| JP | 2009074122 | 4/2009 |
| JP | 2009275249 | 11/2009 |
| JP | 2010018862 | 1/2010 |
| JP | 2010037652 | 2/2010 |
| JP | 2010037655 | 2/2010 |
| JP | 2011052320 | 3/2011 |
| JP | 2011052321 | 3/2011 |
| JP | 2012107332 | 6/2012 |
| JP | 2012107333 | 6/2012 |
| JP | 2012214891 | 11/2012 |
| KR | 20120101596 A | 9/2012 |
| WO | 2011025015 | 3/2011 |
| WO | 2012133910 | 10/2012 |
| WO | 2012133911 | 10/2012 |

OTHER PUBLICATIONS

International Search Report for International Application No. PCT/JP2014/001832 dated Jul. 1, 2014.

Taisuke Miyamoto et al.: "Transactions of the Japan Society of Mechanical Engineers (Series A)", vol. 78, No. 788 (2012), pp. 531-546.

Korean Office Action for Application No. 10-2015-7026339 with partial English language translation, dated Aug. 29, 2016, 9 pages.

Canadian Office Action dated Sep. 2, 2016 for Canadian Application No. 2,907,507, 9 pages.

Extended European Search Report dated Feb. 10, 2016 for European Application No. 14775133.3-1373.

Yoru Wada, Journal of the hydrogen energy systems of Japan, vol. 35, No. 4 (2010), pp. 38-44 (abstract only).

European Telephone Consultation for European Application No. 14 775 133.3, dated Apr. 6, 2018, 3 pages.

* cited by examiner

STEEL MATERIAL, HYDROGEN CONTAINER, METHOD FOR PRODUCING THE STEEL MATERIAL, AND METHOD FOR PRODUCING THE HYDROGEN CONTAINER

CROSS REFERENCE TO RELATED APPLICATIONS

This is the U.S. National Phase application of PCT International Application No. PCT/JP2014/001832, filed Mar. 28, 2014, and claims priority to Japanese Patent Application No. 2013-074654, filed Mar. 29, 2013 and Japanese Patent Application No. 2013-074655, filed Mar. 29, 2013, the disclosures of each of these applications being incorporated herein by reference in their entireties for all purposes.

FIELD OF THE INVENTION

The present invention relates to a steel material and a hydrogen container that have high resistance to fatigue crack propagation in a high-pressure hydrogen atmosphere (or a high-pressure hydrogen environment), a method for producing the steel material, and a method for producing the hydrogen container. The term "steel material" used herein refers to a steel sheet, a steel plate, a steel pipe, and the like.

BACKGROUND OF THE INVENTION

In recent years, worldwide attention has been focused on hydrogen as a clean energy source and as an energy source that enables energy diversification to be achieved. In particular, development of fuel-cell vehicles that use high-pressure hydrogen as a fuel source has been strongly anticipated, and studies on the development of fuel-cell vehicles have been carried out all over the world. In some of the studies, a test for practical use has already been conducted.

Fuel-cell vehicles run on hydrogen contained in a tank mounted thereon instead of on gasoline. Thus, in order to spread the use of fuel-cell vehicles, hydrogen-filling stations, at which refueling is performed instead of gas stations, are required. At a hydrogen-filling station, a hydrogen fuel tank mounted on a vehicle is filled with hydrogen supplied from a hydrogen container, in which hydrogen is stored at a high pressure. While the maximum filling pressure of a vehicle-mounted hydrogen tank is currently 35 MPa, it is desired to increase the maximum filling pressure to 70 MPa in order to increase the driving ranges of fuel-cell vehicles to a level comparable to the driving ranges of gasoline vehicles. Thus, it is required to store and supply hydrogen with safety under such a high-pressure hydrogen atmosphere. Accordingly, the pressure in a hydrogen container used in a hydrogen-filling station, that is, a high-pressure hydrogen storage tank, is currently required to be 40 MPa. If the maximum filling pressure is increased to 70 MPa, the pressure in the high-pressure hydrogen storage tank used in a hydrogen-filling station would be required to be 80 MPa. In other words, in such a case, the high-pressure hydrogen storage tank used in a hydrogen-filling station would be subjected to an 80-MPa atmosphere. It is also desired that steel materials used for producing equipment or the like of hydrogen-filling stations be capable of, for example, storing and supplying hydrogen with safety even under a high-pressure hydrogen atmosphere of 80 MPa.

However, it is known that intrusion of hydrogen into a low-alloy steel causes embrittlement. In the case where the hydrogen pressure is about 15 MPa or less, low-alloy steel plate having a sufficiently large thickness can be used. However, a hydrogen pressure exceeding about 15 MPa increases the risk of hydrogen embrittlement fracture that may occur during service. Therefore, low-alloy steels are not used and, for example, austenitic stainless steels such as SUS316L steel, which are less likely to cause hydrogen embrittlement than low-alloy steels, are used instead.

Since steel materials such as SUS316L steel are expensive and have low strengths, a high-pressure hydrogen storage tank that is designed so as to withstand a hydrogen pressure of 80 MPa needs to have a considerably large thickness. Furthermore, the price of such a high-pressure hydrogen storage tank becomes considerably high. Thus, development of a high-pressure hydrogen storage tank for hydrogen-filling stations which is capable of withstanding a pressure of 80 MPa at a lower cost has been anticipated.

In order to address the above-described issues, several techniques for using low-alloy steel materials for producing a high-pressure hydrogen storage tank have been studied. Patent Literature 1 proposes a steel for high-pressure hydrogen embrittlement resistance in which nondiffusible hydrogen is produced by using a MnS-based or Ca-based inclusion or VC as a hydrogen-trapping site in the steel in order to reduce the risk of embrittlement caused by diffusible hydrogen. Patent Literature 2 and Patent Literature 3 propose a low-alloy high-strength steel having high resistance to high-pressure hydrogen atmosphere embrittlement. The tensile strength of the low-alloy high-strength steel material is controlled within a considerably narrow range of 900 to 950 MPa by performing a tempering treatment at a relatively high temperature during thermal refining of a Cr—Mo steel. Patent Literature 4 proposes a low-alloy steel material for high-pressure hydrogen embrittlement resistance in which a V—Mo-based carbide and increase of tempering temperature are used in order to enhance resistance to high-pressure hydrogen atmosphere embrittlement. Patent Literature 5 proposes a steel material for high-pressure hydrogen storage container which has high resistance to hydrogen. Large amounts of Mo and V are added to the steel material and, during production of steel plate, stress-relief annealing is performed subsequent to a normalizing treatment for long hours to cause a large amount of (Mo,V)C to precipitate. Patent Literature 6 proposes a technique in which the amount of hydrogen intrusion is reduced by reducing the sizes of cementite particles and thereby the toughness of the base material is increased in order to reduce the risk of hydrogen embrittlement. Patent Literature 7 proposes a technique in which formation of coarse cementite particles and island-like martensite (i.e., martensite-austenite constituent (MA)) is inhibited and thereby occurrences of hydrogen intrusion and ductility deterioration are limited in order to reduce the risk of hydrogen embrittlement. The fatigue crack propagation characteristic of ordinary low-alloy steels is described in, for example, Non Patent Literature 1 and Non Patent Literature 2.

CITATION LIST

Patent Literature

[PTL 1] Japanese Unexamined Patent Application Publication No. 2005-2386
[PTL 2] Japanese Unexamined Patent Application Publication No. 2009-46737
[PTL 3] Japanese Unexamined Patent Application Publication No. 2009-275249

[PTL 4] Japanese Unexamined Patent Application Publication No. 2009-74122
[PTL 5] Japanese Unexamined Patent Application Publication No. 2010-37655
[PTL 6] Japanese Unexamined Patent Application Publication No. 2012-107332
[PTL 7] Japanese Unexamined Patent Application Publication No. 2012-107333

Non Patent Literature

[NPL 1] Yoru WADA: "Journal of the Hydrogen Energy Systems Society of Japan", Vol. 35, No. 4 (2010), pp. 38-44
[NPL 2] Taisuke MIYAMOTO et al.: "Transactions of The Japan Society of Mechanical Engineers (Series A)", Vol. 78, No. 788 (2012), pp. 531-546

SUMMARY OF THE INVENTION

A high-pressure hydrogen storage tank, which is used in a particularly high-pressure hydrogen atmosphere, is subjected to a cyclic stress since the storage tank is repeatedly filled with hydrogen, which makes it difficult to achieve a long service life. In order to increase the service life, it is important to reduce fatigue crack propagation rate. In general, the fatigue crack propagation rate is evaluated in the following manner: the relationship between fatigue crack propagation rate da/dN (da/dN: amount of crack propagation per cycle of cyclic load) and stress intensity factor range $\Delta K$ is determined empirically, and the value of da/dN when $\Delta K$ is about 25 MPa·m$^{1/2}$ is used for evaluating the characteristic. It is considered that, in high-pressure hydrogen, the required characteristic is achieved when the value of da/dN is $1.0 \times 10^{-6}$ m/cycle or less. The inventors of the present invention have also found that, in addition to the above-described index, it is desirable to set the C-value, which is determined on the basis of Paris' law da/dN=log(C($\Delta K$)$^m$) (where C and m are constants primarily based on the material used) using data having a stress intensity factor range $\Delta K$ of about 20 to about 50 MPa·m$^{1/2}$, to $8.0 \times 10^{-11}$ or less, which enables the above-described characteristic to be achieved more consistently. However, in the above-described techniques of the related art, it is still impossible to reduce the fatigue crack propagation rate and the C-value to sufficiently low degrees.

Aspects of the present invention were made in light of the above-described fact. An object of aspects of the present invention is to provide a steel material and a hydrogen container that achieves a lower fatigue crack propagation rate in a high-pressure hydrogen atmosphere than steel material used in the related art, a method for producing such a steel material, and a method for producing such a hydrogen container.

Steel materials such as steel pipes and hydrogen containers such as high-pressure hydrogen storage tanks, which are used in the above-described high-pressure hydrogen atmosphere, preferably have a tensile strength TS of less than 900 MPa in order to further increase safety and further reduce the risk of hydrogen embrittlement. In such a case, the tensile strength TS is more preferably set to 700 MPa or more in order to increase the strength of a steel material and thereby reduce the thickness of the container in consideration with the ease of installation of the container.

In the case where primary importance is placed on an increase in strength and weight reduction, the tensile strength TS is desirably set to 900 MPa or more.

The inventors of the present invention have conducted extensive studies in order to address the above-described issues and, as a result, found that it is possible to markedly reduce the fatigue crack propagation rate by dispersing a fine precipitate in a steel material including tempered martensite as a main microstructure. It is possible to markedly reduce the fatigue crack propagation rate by dispersing a fine precipitate in a steel material including tempered martensite as a main microstructure in any of the following cases (i) and (ii):

i) In order to further increase safety, the tensile strength TS of a steel material is preferably set to less than 900 MPa and is more preferably set to 700 MPa or more.

ii) In the case where primary importance is placed on weight reduction, the tensile strength TS of a steel material is set to 900 MPa or more.

Specifically, the summary of the present invention is as follows.

[1] A steel material having a good fatigue crack propagation characteristic in a high-pressure hydrogen atmosphere, the steel material including: a composition containing, by mass, C: 0.05% to 0.60%, Si: 0.01% to 2.0%, Mn: 0.3% to 3.0%, P: 0.001% to 0.040%, S: 0.0001% to 0.010%, N: 0.0001% to 0.0060%, Al: 0.01% to 1.5%, one or more elements selected from Ti: 0.01% to 0.20%, Nb: 0.01% to 0.20%, and V: 0.01% or more and less than 0.05%, and one or more elements selected from B: 0.0001% to 0.01%, Mo: 0.005% to 2.0%, and Cr: 0.005% to 3.0%, with the balance being Fe and inevitable impurities;

and a steel microstructure that includes 95% or more of tempered martensite on a volume fraction basis, that includes a precipitate having a diameter of 100 nm or less and including one or more elements selected from Ti, Nb, and V and one or more elements selected from carbon and nitrogen at a density of 50 particles/$\mu m^2$ or more, and that includes prior austenite having a grain diameter of 3 μm or more.

[2] The steel material having a good fatigue crack propagation characteristic in a high-pressure hydrogen atmosphere which is described in [1] above, the steel material including, by mass, C: 0.05% or more and less than 0.21%.

[3] The steel material having a good fatigue crack propagation characteristic in a high-pressure hydrogen atmosphere which is described in [1] above, the steel material including, by mass, C: 0.21% to 0.60%.

[4] The steel material having a good fatigue crack propagation characteristic in a high-pressure hydrogen atmosphere which is described in any one of [1] to [3] above, the steel material further including, by mass, one or more elements selected from Ni: 0.005% to 0.70% and Cu: 0.005% to 2.00%.

[5] The steel material having a good fatigue crack propagation characteristic in a high-pressure hydrogen atmosphere which is described in any one of [1] to [4] above, the steel material further including, by mass, one or more elements selected from Ca: 0.001% to 0.01% and REM: 0.001% to 0.01%.

[6] The steel material having a good fatigue crack propagation characteristic in a high-pressure hydrogen atmosphere which is described in any one of [1] to [5] above, the steel material further including, by mass, one or more elements selected from Mg: 0.001% to 0.01% and Zr: 0.001% to 0.01%.

[7] The steel material having a good fatigue crack propagation characteristic in a high-pressure hydrogen atmosphere which is described in any one of [1] to [6] above, the steel material further including, by mass, Sb: 0.0001% to 0.1%.

[8] The steel material having a good fatigue crack propagation characteristic in a high-pressure hydrogen atmosphere which is described in any one of [1] to [7] above, the steel material further including, by mass, W: 0.001% to 1%.

[9] The steel material having a good fatigue crack propagation characteristic which is described in any one of [1] to [8] above, the steel material being a steel pipe.

[10] A hydrogen container having a good fatigue crack propagation characteristic in a high-pressure hydrogen atmosphere including: the composition described in any one of [1] to [8] above;

and a steel microstructure that includes 95% or more of tempered martensite on a volume fraction basis, that includes a precipitate having a diameter of 100 nm or less and including one or more elements selected from Ti, Nb, and V and one or more elements selected from carbon and nitrogen at a density of 50 particles/$\mu m^2$ or more, and that includes prior austenite having a grain diameter of 3 μm or more.

[11] A method for producing a steel material having a good fatigue crack propagation characteristic in a high-pressure hydrogen atmosphere, the steel material including a steel microstructure that includes 95% or more of tempered martensite on a volume fraction basis, that includes a precipitate having a diameter of 100 nm or less and including one or more elements selected from Ti, Nb, and V and one or more elements selected from carbon and nitrogen at a density of 50 particles/$\mu m^2$ or more, and that includes prior austenite having a grain diameter of 3 μm or more, the method including: heating a steel having the composition described in any one of [1] to [8] to 1100° C. or more; performing working in such a manner that a working ratio from 950° C. to a finishing, temperature is 20% or less, the finishing temperature being 800° C. or more; performing cooling to 350° C. or less at a cooling rate of 1° C./sec. or more; performing heating to 400° C. or more and 750° C. or less, followed by holding for 60 seconds or more; and performing cooling.

[12] A method for producing a steel pipe having a good fatigue crack propagation characteristic in a high-pressure hydrogen atmosphere, the steel pipe including a steel microstructure that includes 95% or more of tempered martensite on a volume fraction basis, that includes a precipitate having a diameter of 100 nm or less and including one or more elements selected from Ti, Nb, and V and one or more elements selected from carbon and nitrogen at a density of 50 particles/$\mu m^2$ or more, and that includes prior austenite having a grain diameter of 3 μm or more, the method including: heating a steel having the composition described in any one of [1] to [8] to 1100° C. or more; performing working in such a manner that a pipe-expanding ratio from 950° C. to a finishing temperature is 20% or less, the finishing temperature being 800° C. or more; performing cooling to 350° C. or less at a cooling rate of 1° C./sec. or more; performing heating to 400° C. or more and 750° C. or less, followed by holding for 60 seconds or more; and performing cooling.

[13] A method for producing a steel material having a good fatigue crack propagation characteristic in a high-pressure hydrogen atmosphere, the steel material including a steel microstructure that includes 95% or more of tempered martensite on a volume fraction basis, that includes a precipitate having a diameter of 100 nm or less including one or more elements selected from Ti, Nb, and V and one or more elements selected from carbon and nitrogen at a density of 50 particles/$\mu m^2$ or more, and that includes prior austenite having a grain diameter of 3 μm or more, the method including: heating a steel material having the composition described in any one of [1] to [8] to 800° C. or more, the steel material having a microstructure having an average particle diameter of 3 μm or more, the microstructure being formed by performing saturated picric acid etching, followed by holding for 60 seconds or more; performing cooling to 350° C. or less at a cooling rate of 1° C./sec. or more; performing heating to 400° C. or more and 750° C. or less, followed by holding for 60 seconds or more; and performing cooling.

[14] A method for producing a hydrogen container having a good fatigue crack propagation characteristic in a high-pressure hydrogen atmosphere, the hydrogen container including a steel microstructure that includes 95% or more of tempered martensite on a volume fraction basis, that includes a precipitate having a diameter of 100 nm or less and including one or more elements selected from Ti, Nb, and V and one or more elements selected from carbon and nitrogen at a density of 50 particles/$\mu m^2$ or more, and that includes prior austenite having a grain diameter of 3 μm or more, the method including: forming a steel material having the composition described in any one of [1] to [8] into a container having a desired shape, the steel material having a microstructure having an average particle diameter of 3 μm or more, the microstructure being formed by performing saturated picric acid etching; performing heating to 800° C. or more, followed by holding for 60 seconds or more; performing cooling to 350° C. or less at a cooling rate of 1° C./sec. or more; performing heating to 400° C. or more and 750° C. or less, followed by holding for 60 seconds or more; and performing cooling.

According to aspects of the present invention, a markedly low fatigue crack propagation rate in a high-pressure hydrogen atmosphere of 80 MPa or more, which is lower than those of steels used in the related art, may be achieved. Furthermore, the service lives of high-pressure hydrogen storage tanks or the like used in a high-pressure hydrogen atmosphere may be increased. In addition, the safety of hydrogen storage containers used in a high-pressure hydrogen atmosphere may be increased. The steel material and the container according to aspects of the present invention can also be used even in a hydrogen atmosphere in a relatively low-hydrogen-pressure atmosphere.

DETAILED DESCRIPTION OF EMBODIMENTS OF THE INVENTION

Aspects of the present invention are described specifically below.

First, the reasons for limiting the composition of the steel material to the above-described ranges in accordance with aspects of the present invention are described. Hereinafter, when referring to a composition, the symbol "%" refers to "% by mass" unless otherwise specified.

C: 0.05% to 0.60%

Carbon (C) is an element that is necessary for increasing the strength of a martensite microstructure. C reacts with Ti, Nb, V, Mo, or Cr to form an alloy carbide, which reduces the risk of local accumulation of dislocation that may occur during fatigue deformation in a high-pressure hydrogen atmosphere. In a steel having a TS of less than 900 MPa, this effect occurs when the C content is 0.05% or more. In a steel having a TS of 900 MPa or more, this effect occurs when the C content is 0.21% or more. Thus, the C content needs to be 0.05% or more. In order to produce a steel having a TS of 900 MPa or more, the C content is preferably set to 0.21% or more. However, if the C content exceeds 0.60%, the effect may become saturated. In addition, it may become difficult to perform working such as rolling in the production of the steel material. Furthermore, it may become difficult to forming the steel material into a container. Accordingly, in aspects of the present invention, the C content is limited to 0.05% or more and 0.60% or less. If the C content is 0.21% or more, it may become difficult to produce a steel having a TS of less than 900 MPa. Thus, in order to produce a steel having a TS of less than 900 MPa, the C content is preferably set to 0.05% or more and less than 0.21% and is further preferably set to 0.10% or more and 0.15% or less. In order to produce a steel having a TS of 900 MPa or more, the C content is preferably set to 0.21% or more and 0.60% or less and is further preferably 0.23% or more and 0.35% or less.

Si: 0.01% to 2.0%

Silicon (Si) is an element that causes solid solution strengthening to occur, thereby contributes to an increase in strength, and reduces the risk of local accumulation of dislocation. This effect occurs when the Si content is 0.01% or more. Accordingly, the Si content is set to 0.01% or more and is preferably set to 0.02% or more. However, if the Si content exceeds 2.0%, the effect may become saturated. Moreover, it may become difficult to perform rolling and forming. Accordingly, the Si content is set to 2.0% or less and is preferably set to 0.5% or less. Thus, the Si content is limited to 0.01% or more and 2.0% or less.

Mn: 0.3% to 3.0%

Manganese (Mn) is an element that causes solid solution strengthening to occur, enhances hardenability (or quench hardenability), thereby contributes to an increase in the strength of a steel, and reduces the risk of local accumulation of dislocation. This effect occurs when the Mn content is 0.3% or more. Accordingly, the Mn content is set to 0.3% or more and is preferably set to 0.5% or more. However, if the Mn content exceeds 3.0%, the effect may become saturated. Moreover, it may become difficult to perform rolling and forming. In addition, fatigue crack propagation rate may be increased. Furthermore, large amounts of untempered hard martensite and austenite may remain, which deteriorates fatigue characteristic. Accordingly, the Mn content is set to 3.0% or less and is preferably set to 1.5% or less. Thus, the Mn content is limited to 0.3% or more and 3.0% or less and is preferably set to 0.3% or more and 1.5% or less.

P: 0.001% to 0.040%

Phosphorus (P) is an element that contributes to an increase in strength. However, on the other hand, this element may reduce toughness and increase fatigue crack propagation rate. This disadvantageous effect may become significant if the P content exceeds 0.040%. Accordingly, the P content is set to 0.040% or less, is preferably set to 0.025% or less, and is more preferably set to 0.015% or less. However, an excessively low P content of less than 0.001% may increase the production cost in a steelmaking process. Accordingly, the P content is set to 0.001% or more. Thus, the P content is limited to 0.001% or more and 0.040% or less, is preferably set to 0.001% or more and 0.025% or less, and is more preferably set to 0.001% or more and 0.015% or less.

S: 0.0001% to 0.010%

An increase in the sulfur (S) content may cause hot and red brittleness to occur, which leads to problems in a production process. In addition, an inclusion MnS may be formed, which reduces toughness. Furthermore, an increase in the S content increases fatigue crack propagation rate. However, these disadvantageous effects are negligible when the S content is 0.010% or less. Accordingly, the S content is set to 0.010% or less and is preferably set to 0.0030% or less. However, an excessively low S content of less than 0.0001% may increase the desulfurization cost in a steelmaking process. Accordingly, the S content is set to 0.0001% or more. Thus, the S content is limited to 0.0001% or more and 0.010% or less and is preferably set to 0.0001% or more and 0.0030% or less.

N: 0.0001% to 0.0060%

Since the impact of nitrogen (N) on hydrogen embrittlement is small, the advantageous effects of aspects of the present invention are not impaired when the N content is 0.0060% or less. Accordingly, the N content is set to 0.0060% or less and is preferably set to 0.004% or less. A low N content is desirable in order to increase toughness, but leads to a high steelmaking cost. Accordingly, the lower limit of the N content is set to 0.0001%. Thus, the N content is set to 0.0001% or more and 0.0060% or less.

Al: 0.01% to 1.5%

Aluminum (Al) is an element used as a deoxidizer in a steelmaking process in an effective manner. Al also inhibits precipitation of cementite and causes cementite to be dispersed in the form of fine particles. In order to enable these effects to occur, the Al content is set to 0.01% or more and is preferably set to 0.02% or more. However, if the Al content exceeds 1.5%, the alloy cost of the steel may be increased. Furthermore, the Ac3 point may be considerably increased, which deteriorates hardenability. Accordingly, the Al content is set to 1.5% or less, is preferably set to 1.0% or less, and is more preferably set to 0.5% or less. Thus, the Al content is limited to 0.01% or more and 1.5% or less, is preferably set to 0.02% or more and 1.0% or less, and is further preferably set to 0.5% or less.

One or More Elements Selected from Ti: 0.01% to 0.20%, Nb: 0.01% to 0.20%, and V: 0.01% or More and Less Than 0.05%

Titanium (Ti), niobium (Nb), and vanadium (V) each react with C or N to form a fine carbide or a fine nitride during hardening or tempering. This reduces the risk of local accumulation of dislocation that may occur during fatigue deformation in hydrogen atmosphere and thereby reduces fatigue crack propagation rate. In order to enable this effect to occur, one or more elements selected from Ti: 0.01% or more, Nb: 0.01% or more, and V: 0.01% or more are added to a steel. The contents of Ti, Nb, and V are preferably Ti: 0.07% or more, Nb: 0.12% or more, and V: 0.02% or more. However, if the Ti content exceeds 0.20%, the Nb contents exceeds 0.20%, or the V content is 0.05% or more, the effect may become saturated. Accordingly, the contents of Ti, Nb, and V are set to Ti: 0.20% or less, Nb: 0.20% or less, and V: less than 0.05% and are preferably set to Ti: 0.15% or less, Nb: 0.15% or less, and V: 0.03% or less. Thus, the contents of Ti, Nb, and V are limited to Ti: 0.01% or more and 0.20% or less, Nb: 0.01% or more and 0.20% or less, and V: 0.01% or more and less than 0.05%.

One or More Elements Selected from B: 0.0001% to 0.01%, Mo: 0.005% to 2.0%, and Cr: 0.005% to 3.0%

Boron (B), molybdenum (Mo), and chromium (Cr) may be added to a steel in order to increase ease of hardening performed subsequent to annealing and thereby achieve a high TS. Mo and Cr also contribute to formation of an alloy carbide, which reduces fatigue crack propagation rate. In order to enable these effects to occur, one or more elements selected from B: 0.0001% or more, Mo: 0.005% or more, and Cr: 0.005% or more are added to a steel. The contents of B, Mo, and Cr are preferably B: 0.0015% or more, Mo: 0.30% or more, and Cr: 0.02% or more and are more preferably B: 0.0020% or more, Mo: 0.50% or more, and Cr: 0.50% or more. However, if the B content exceeds 0.01%, the Mo content exceeds 2.0%, or the Cr content exceeds 3.0%, the effects may become saturated. Accordingly, the contents of B, Mo, and Cr are set to B: 0.01% or less, Mo: 2.0% or less, and Cr: 3.0% or less and are preferably set to B: 0.003% or less, Mo: 1.5% or less, and Cr: 2.0% or less. Thus, the contents of B, Mo, and Cr are limited to B: 0.0001% or more and 0.01% or less, Mo: 0.005% or more and 2.0% or less, and Cr: 0.005% or more and 3.0% or less.

In accordance with aspects of the present invention, the above-described components are essential in order to reduce fatigue crack propagation rate in a high-pressure hydrogen atmosphere. In accordance with aspects of the present invention, optionally, the following components may be added to a steel alone or in combination as needed: one or more elements selected from Ni: 0.005% to 0.70% and Cu: 0.005% to 2.00%; one or more elements selected from Ca: 0.001% to 0.01% and REM: 0.001% to 0.01%; one or more elements selected from Mg: 0.001% to 0.01% and Zr: 0.001% to 0.01%; Sb: 0.0001% to 0.1%; and W: 0.001% to 1%. The balance other than the above-described components is composed of Fe and inevitable impurities.

Ni: 0.005% to 0.70%

Nickel (Ni) may be added to a steel in order to increase ease of hardening performed subsequent to annealing, which makes it easy to increase TS. This effect occurs when the Ni content is 0.005% or more. However, if the Ni content exceeds 0.70%, large amounts of untempered hard martensite and austenite are likely to remain. Accordingly, when Ni is added to a steel, the Ni content is set to 0.005% or more and 0.70% or less and is preferably set to 0.02% or more and 0.05% or less.

Cu: 0.005% to 2.00%

Similarly to Ni, copper (Cu) may be added to a steel in order to increase ease of hardening performed subsequent to annealing, which makes it easy to increase TS. This effect occurs when the Cu content is 0.005% or more, but may become saturated if the Cu content exceeds 2.00%. Accordingly, when Cu is added to a steel, the Cu content is set to 0.005% or more and 2.00% or less and is preferably set to 0.02% or more and 1.00% or less.

Ca: 0.001% to 0.01%

Calcium (Ca) enables the shapes of sulfides such as MnS to be controlled and thereby increases toughness. This effect occurs when the Ca content is 0.001% or more, but may become saturated if the Ca content exceeds 0.01%. Accordingly, when Ca is added to a steel, the Ca content is set to 0.001% or more and 0.01% or less and is preferably set to 0.001% or more and 0.005% or less.

REM: 0.001% to 0.01%

Similarly to Ca, REM enables the shapes of sulfides such as MnS to be controlled and thereby increases toughness. This effect occurs when the REM content is 0.001% or more, but may become saturated if the REM content exceeds 0.01%. Accordingly, when REM is added to a steel, the REM content is set to 0.001% or more and 0.01% or less and is preferably set to 0.001% or more and 0.005% or less. Note that "REM" is an abbreviation for "rare earth metal".

Mg: 0.001% to 0.01%

Magnesium (Mg) causes a precipitate to be formed, which reduces the risk of local accumulation of dislocation that may occur during fatigue deformation in a hydrogen atmosphere and thereby reduces fatigue crack propagation rate. In order to enable this effect to occur, the Mg content needs to be 0.001% or more. However, if the Mg content exceeds 0.01%, the effect may become saturated. Accordingly, when Mg is added to a steel, the Mg content is set to 0.001% or more and 0.01% or less.

Zr: 0.001% to 0.01%

Similarly to Mg, zirconium (Zr) causes a precipitate to be formed, which reduces the risk of local accumulation of dislocation that may occur during fatigue deformation in a hydrogen atmosphere and thereby reduces fatigue crack propagation rate. In order to enable this effect to occur, the Zr content needs to be 0.001% or more. However, if the Zr content exceeds 0.01%, the effect may become saturated. Accordingly, when Zr is added to a steel, the Zr content is set to 0.001% or more and 0.01% or less.

Sb: 0.0001% to 0.1%

Antimony (Sb) inhibits the deviation of the grain diameter in the surface layer of a steel plate, thereby improves the surface quality, and inhibits decarburization of the surface portion of the steel plate. In order to enable this effect to occur, the Sb content needs to be 0.0001% or more and is preferably set to 0.0010% or more. However, if the Sb content exceeds 0.1%, the effect may become saturated and the cost is rapidly increased. Accordingly, the Sb content is set to 0.1% or less and is preferably set to 0.01% or less. Thus, when Sb is added to a steel, the Sb content is set to 0.0001% or more and 0.1% or less.

W: 0.001% to 1%

Tungsten (W) reacts with C to form a fine carbide, thereby, similarly to Ti, Nb, and the like, reduces the risk of local accumulation of dislocation that may occur during fatigue deformation in a hydrogen atmosphere, and reduces fatigue crack propagation rate. In order to enable this effect to occur, the W content need to be 0.001% or more and is preferably set to 0.01% or more. However, if the W content exceeds 1%, the effect may become saturated and the cost is rapidly increased. Accordingly, the W content is set to 1% or less and is preferably set to 0.1% or less. Thus, when W is added to a steel, the W content is set to 0.001% or more and 1% or less.

Next, the microstructure of the steel material is described.

The steel material and the hydrogen container composed of a steel according to aspects of the present invention have a steel microstructure that includes 95% or more of tempered martensite on a volume fraction basis, that includes a precipitate having a diameter of 100 nm or less and including one or more elements selected from Ti, Nb, and V and one or more elements selected from carbon and nitrogen at a density of 50 particles/$\mu m^2$ or more, and that includes prior austenite having a grain diameter of 3 μm or more.

Volume Fraction of Tempered Martensite: 95% or More

A microstructure mainly constituted by tempered martensite needs to be formed in order to achieve a tensile strength TS of less than 900 MPa and more preferably achieve a tensile strength TS of 700 MPa or more and to disperse the precipitate having a diameter of 100 nm or less described below at a density of 50 particles/$\mu m^2$ or more in the case where the C content is set to 0.05% or more and less than 0.21%. A microstructure mainly constituted by tempered martensite needs to be formed in order to achieve a tensile strength TS of 900 MPa or more and to disperse the precipitate having a diameter of 100 nm or less described below at a density of 50 particles/we or more in the case where the C content is set to 0.21% or more and 0.60% or less. It is necessary to form a microstructure mainly constituted by tempered martensite in order to cause a precipitate to be formed during tempering performed subsequent to hardening, which enables the precipitate to be uniformly and finely dispersed. If a microstructure other than tempered martensite serves as a main microstructure, the precipitate may be dispersed nonuniformly and the desired characteristic may fail to be achieved. Although mixing of a microstructure other than tempered martensite may limit the reduction in fatigue crack propagation rate and reduce toughness, the advantageous effects of aspects of the present invention are not impaired when the volume fraction of tempered martensite is 95% or more. In other words, the allowable total fraction of microstructures other than tempered martensite is 5% or less. Thus, the volume fraction of tempered martensite is set to 95% or more. Examples of the microstructures other than tempered martensite include martensite, austenite, bainite, tempered bainite, ferrite, and pearlite. As described above, one or more microstructures selected from these microstructures may be mixed in such a manner that the total volume fraction of the microstructures is 5% or less.

Density of Precipitate Having Diameter of 100 nm or Less Which Includes One or More Elements Selected from Ti, Nb, and V and One or More Elements Selected from Carbon and Nitrogen: 50 Particles/$\mu m^2$ or More A microstructure including a precipitate which has a diameter of 100 nm or less and which includes one or more elements selected from Ti, Nb, and V and one or more elements selected from carbon and nitrogen (i.e., one or more selected from a carbide, a nitride, and a carbonitride) at a density of 50 particles/$\mu m^2$ or more, may reduce fatigue crack propagation rate in a hydrogen atmosphere. The precipitate may further include, in addition to these elements, Mo, Cr, and the like.

A precipitate including one or more elements selected from Ti, Nb, and V and one or more elements selected from carbon and nitrogen is likely to be finely formed in alignment with base metal and is likely to trap hydrogen therein. The above-described precipitate having a diameter of 100 nm or less is likely to trap hydrogen in the periphery of the precipitate and thereby reduces the risk of local accumulation of hydrogen. If the diameter of the precipitate exceeds 100 nm, fatigue cracking is likely to occur and the reduction in fatigue crack propagation in a hydrogen atmosphere may be limited. If the precipitate density is less than 50 particles/$\mu m^2$, the reduction in the risk of local accumulation of hydrogen may be limited. Accordingly, in aspects of the present invention, the density of a precipitate having a diameter of 100 nm or less which includes one or more elements selected from Ti, Nb, and V and one or more elements selected from carbon and nitrogen is set to 50 particles/$\mu m^2$ or more. The diameter of the precipitate is preferably 50 nm or less. The diameter of the precipitate is preferably 1 nm or more. The precipitate density is preferably 80 particles/$\mu m^2$ or more. The precipitate density is preferably 200 particles/$\mu m^2$ or less.

Grain Diameter of Prior Austenite: 3 $\mu m$ or More

If the grain diameter of prior austenite is less than 3 $\mu m$, cracks are likely to link up with one another, which increases the speed of crack propagation. As a result, the desired characteristic may fail to be achieved. Accordingly, the grain diameter of prior austenite is set to 3 $\mu m$ or more. It is preferable to set the grain diameter of prior austenite to be large. Specifically, the grain diameter of prior austenite is preferably 10 $\mu m$ or more and is more preferably 15 $\mu m$ or more. The grain diameter of prior austenite is preferably 30 $\mu m$ or less.

A method and the like for producing the steel material such as a steel sheet, a steel plate, or a steel pipe and the hydrogen container according to aspects of the present invention are not particularly limited as long as a steel material or a hydrogen container has the above-described chemical composition and the above-described microstructure. Preferable methods for producing the steel material and the hydrogen container are described below.

Preferable conditions for producing the steel material according to aspects of the present invention are described below.

A steel such as a slab is produced from a molten steel having the above-described composition by a continuous casting process or an ingot-making and slabbing method. After being heated to 1100° C. or more, the steel is subjected to working with a finishing temperature of 800° C. or more in such a manner that the working ratio from 950° C. to the finishing temperature is 20% or less. Subsequently, cooling to 350° C. or less at a cooling rate of 1° C./sec. or more, heating to 400° C. or more and 750° C. or less, followed by holding for 60 seconds or more, and cooling are performed. Thus, the steel material is worked into a desired form. Examples of the form of the steel material include, but are not particularly limited to, a plate material, a pipe material, and a shape material. For example, the above-described steel material may be worked into the form of a pipe material, that is, a steel pipe, and used as a material of a high-pressure storage tank or as a hydrogen transportation pipe. The term "working" used herein refers to working for producing a steel material. For example, in the case where the steel material has a plate-like shape such as a steel plate, the term "working" refers to rolling and the term "working ratio" refers to rolling reduction ratio. In the case where the steel material is a steel pipe, the term "working" refers to pipe expanding and the term "working ratio" refers to pipe-expanding ratio.

Specifically, for example, a steel material having a plate-like shape, such as a steel plate, is produced in the following manner. After being heated to 1100° C. or more, the steel is subjected to rolling with a finishing temperature of 800° C. or more in such a manner that the rolling reduction ratio from 950° C. to the finishing temperature is 20% or less. Subsequently, cooling to 350° C. or less at a cooling rate of 1° C./sec. or more, heating to 400° C. or more and 750° C. or less, followed by holding for 60 seconds or more, and cooling are performed. Thus, the steel material is worked into a desired form. In the case where the steel material is a steel pipe, the steel material is produced in the following manner. After being heated to 1100° C. or more, the steel is subjected to pipe expanding with a finishing temperature of 800° C. or more in such a manner that the pipe-expanding ratio from 950° C. to the finishing temperature is 20% or less. Subsequently, cooling to 350° C. or less at a cooling rate of 1° C./sec. or more, heating to 400° C. or more and 750° C. or less, followed by holding for 60 seconds or more, and cooling are performed. Thus, the steel material is worked into a desired form.

The specific ranges to which the conditions for producing the above-described steel material are limited and the reasons for limiting the ranges are described specifically below.

Steel-Heating Temperature: 1100° C. or More

Since one or more elements selected from Ti, Nb, and V are used in accordance with aspects of the present invention, these elements, that is, Ti, Nb, and V, precipitate in a steel such as a steel slab in the form of large particles during solidification. It is necessary to dissolve this precipitate while heating is performed prior to hot working such as hot rolling or hot pipe-expanding. Accordingly, it is necessary to set the steel-heating temperature to 1100° C. or more. Heating the steel to 1100° C. or more is also advantageous in order to scale-off the defects such as voids or segregation which may occur in the surface layer of a steel such as a slab, thereby reduce cracks and irregularities formed in the surface of the steel plate, and achieve smooth surface of the steel plate. Thus, the steel-heating temperature is set to 1100° C. or more and is preferably set to 1150° C. or more. This effect may become saturated and the cost may be increased if the heating temperature exceeds 1300° C. Thus, the steel-heating temperature is preferably 1300° C. or less and is more preferably 1250° C. or less.

Performing Working in Such Manner That the Working Ratio from 950° C. to Finishing Temperature of 800° C. or More Is 20% or Less, Followed by Cooling to 350° C. or Less at Cooling Rate of 1° C./sec. or More If the finishing temperature for hot working is less than 800° C., ferrite is likely to be mixed in the final microstructure. If the working ratio from 950° C. to the finishing temperature exceeds 20%, ferrite transformation and bainite transformation are likely to occur during cooling, which may inhibit formation of the predetermined microstructure. If the cooling rate is less than 1° C./sec. or the cooling target temperature (i.e., cooling stop temperature) exceeds 350° C., it may be difficult to set the volume fraction of a martensite microstructure to 95% or more and the volume fraction of a tempered martensite to 95% or more. Accordingly, working with a finishing temperature of 800° C. or more is performed in such a manner that the working ratio from 950° C. to the finishing temperature is 20% or less, and subsequently cooling to 350° C. or less at a cooling rate of 1° C./sec. or more is performed. The finishing temperature is preferably set to 850° C. or more. The cooling rate is preferably set to 10° C./sec. or more.

As described above, the term "working ratio" used herein refers to roll reduction ratio in the case where rolling is performed and pipe-expanding ratio in the case where pipe expanding is performed. The working ratio is preferably set to 15% or less. The working ratio is preferably set to 2% or more. The finishing temperature is preferably 1000° C. or less because a finishing temperature exceeding 1000° C. may increase the cost. If the cooling rate exceeds 500° C./sec, hardening cracking and shape defects may occur in the steel material. Accordingly, the cooling rate is preferably set to 500° C./sec. or less and is more preferably set to 100° C./sec. or less. The target temperature during cooling is preferably as low as possible. Specifically, the target temperature during cooling is preferably 100° C. or less. Cooling may be performed in accordance with the conventional method. For example, water cooling, oil cooling, air cooling, and mist cooling may be employed.

Performing Heating to 400° C. or More and 750° C. or Less, Followed by Holding for 60 Seconds or More, and Subsequently Performing Cooling The steel material including a martensite microstructure, which has been subjected to the above-described working and cooling, is heated (reheated) to 400° C. or more and subsequently held for 60 seconds or more in order to perform tempering and cause a desired precipitate to be formed. Heating is preferably performed to 550° C. or more. The holding time is preferably set to 1800 seconds or more. If the heating temperature during tempering exceeds 750° C., a part of the martensite microstructure may be transformed into austenite, which increases the amounts of untempered hard martensite and austenite that occur after cooling. Accordingly, the heating temperature during tempering is set to 750° C. or less and is preferably set to 720° C. or less. In order to increase the amount of precipitate, the heating temperature during tempering is preferably set to 550° C. or more and 720° C. or less, and the holding time is preferably set to 1800 seconds or more. The holding time is preferably set to about 3 hours or less because an excessively long holding time may increase the cost.

Alternatively, the steel material according to aspects of the present invention may also be produced by heating a steel material having a microstructure having an average grain diameter of 3 μm or more to 800° C. or more, the microstructure being formed by performing saturated picric acid etching, followed by holding for 60 seconds or more; performing cooling to 350° C. or less at a cooling rate of 1° C./sec. or more; performing heating to 400° C. or more and 750° C. or less, followed by holding for 60 seconds or more; and performing cooling.

Average Grain Diameter of Microstructure Formed by Performing Saturated Picric Acid Etching: 3 μm or More It is possible to remove phosphorus segregation parts, that is, the prior-austenite grain boundary, the ferrite grain boundary, the pearlite region boundary, and the bainite region boundary, by performing saturated picric acid etching. Therefore, the average diameter of these grains can be determined by measuring the average grain diameter of the microstructure formed by performing saturated picric acid etching. Hereinafter, this average diameter is referred to as "average grain diameter". If the average grain diameter of the microstructure formed by subjecting the steel material, which serves as a raw material, to saturated picric acid etching is less than 3 μm, the grain diameter of prior-gamma may become small while the steel material, which serves as a raw material, is heated and, during cooling, ferrite transformation and bainite transformation may occur. As a result, the desired characteristic may fail to be achieved. Accordingly, a steel material having a microstructure having an average grain diameter of 3 μm or more, the microstructure being formed by performing saturated picric acid etching, is used as a raw material. The average grain diameter of the microstructure is more preferably 5 μm or more. The average grain diameter is preferably 30 μm or less because the performances may become saturated if the average grain diameter is more than 30 μm.

Performing Heating to 800° C. or More, Followed by Holding for 60 Seconds or More, and Subsequently Performing Cooling to 350° C. or Less at Cooling Rate of 1° C./sec. or More If the heating temperature is set to less than 800° C., ferrite is likely to be mixed in the final microstructure. If the holding time is set to less than 60 seconds, the temperature of the steel plate may become nonuniform in the thickness direction, which results in production of faulty products. If the cooling rate is less than 1° C./sec. or the cooling target temperature exceeds 350° C., it may be difficult to set the fraction of a martensite microstructure to 95% or more. Accordingly, the heating temperature is set to 800° C. or more and, after holding for 60 seconds or more, cooling to 350° C. or less at a cooling rate of 1° C./sec. or more is performed. The heating temperature is preferably 820° C. or more. The holding time is preferably 120 seconds or more. The cooling rate is preferably 8° C./sec. or more. The heating temperature is preferably 1000° C. or less because a heating temperature exceeding 1000° C. may increase the cost. The holding time is preferably 1 hour or less because an excessively long holding time may increase the cost. If the cooling rate exceeds 500° C./sec, hardening cracking and shape defects may occur in the steel material. Therefore, the cooling rate is preferably 500° C./sec. or less and is more preferably 100° C./sec. or less. The target temperature during cooling is preferably as low as possible. Specifically, the target temperature during cooling is preferably 100° C. or less. Cooling may be performed by the conventional method. For example, water cooling, oil cooling, air cooling, and mist cooling may be employed.

Performing Heating to 400° C. or More and 750° C. or Less, Followed by Holding for 60 Seconds or More, and Subsequently Performing Cooling It is necessary to perform heating (reheating) to 400° C. or more in order to temper the martensite to form tempered martensite. It is preferable to perform heating to 550° C. or more. Performing tempering at a temperature exceeding 750° C. may cause a part of the steel microstructure to transform into austenite, which increases the amounts of hard untempered martensite and austenite that occur after cooling. Accordingly, heating to 750° C. or less is performed. It is preferable to perform heating to 720° C. or less. It is necessary to perform holding for 60 seconds or more in order to temper the steel material or the steel pipe uniformly in the thickness direction. The holding time is preferably 1800 seconds or more. In order to increase the amount of precipitate, it is preferable to perform tempering at 550° C. or more and 720° C. or less for 1800 seconds or more. The holding time is preferably 3 hours or less because an excessively long holding time may increase the cost.

Preferable conditions for producing the hydrogen container are described below.

The hydrogen container according to aspects of the present invention is produced by forming a steel material having the above-described composition and having a microstructure having an average grain diameter of 3 µm or more into a container having a desired shape, the microstructure being formed by performing saturated picric acid etching; subsequently performing heating to 800° C. or more, followed by holding for 60 seconds or more; performing cooling to 350° C. or less at a cooling rate of 1° C./sec. or more; performing heating to 400° C. or more and 750° C. or less, followed by holding for 60 seconds or more; and then cooling the container. The specific ranges to which the conditions for producing the above-described hydrogen container are limited and the reasons for limiting the ranges are described specifically below.

Average Grain Diameter of Microstructure Formed by Performing Saturated Picric Acid Etching: 3 µm or More It is possible to remove phosphorus segregation parts, that is, the prior-austenite grain boundary, the ferrite grain boundary, the pearlite region boundary, and the bainite region boundary, by performing saturated picric acid etching. Therefore, the average diameter of these grains can be determined by measuring the average grain diameter of the microstructure formed by performing saturated picric acid etching. Hereinafter, this average diameter is referred to as "average grain diameter". If the average grain diameter of the microstructure formed by subjecting the steel material, which serves as a raw material, to saturated picric acid etching is less than 3 µm, the grain diameter of prior-gamma may become small while the steel material, which serves as a raw material, is heated and, during cooling, ferrite transformation and bainite transformation may occur. As a result, the desired characteristic may fail to be achieved. Accordingly, a steel material having a microstructure having an average grain diameter of 3 µm or more, the microstructure being formed by performing saturated picric acid etching, is used as a raw material. The average grain diameter of the microstructure is more preferably 5 µm or more. The average grain diameter is preferably 30 µm or less because the performances may become saturated if the average grain diameter is more than 30 µm.

The steel material may be formed into a container having a desired shape by any conventional method. It is not necessary to limit the conditions and the like.

Performing Heating to 800° C. or More, Followed by Holding for 60 Seconds or More, and Subsequently Performing Cooling to 350° C. or Less at Cooling Rate of 1° C./sec. or More If the heating temperature is set to less than 800° C., ferrite is likely to be mixed in the final microstructure. If the holding time is set to less than 60 seconds, the temperature of the steel plate may become nonuniform in the thickness direction, which results in production of faulty products. If the cooling rate is less than 1° C./sec. or the cooling target temperature exceeds 350° C., it may be difficult to set the fraction of a martensite microstructure to 95% or more. Accordingly, the heating temperature is set to 800° C. or more and, after holding for 60 seconds or more, cooling to 350° C. or less at a cooling rate of 1° C./sec. or more is performed. The heating temperature is preferably 820° C. or more. The holding time is preferably 120 seconds or more. The cooling rate is preferably 8° C./sec. or more. The heating temperature is preferably 1000° C. or less because a heating temperature exceeding 1000° C. may increase the cost. The holding time is preferably 1 hour or less because an excessively long holding time may increase the cost. If the cooling rate exceeds 500° C./sec, hardening cracking and shape defects may occur in the steel material. Therefore, the cooling rate is preferably 500° C./sec. or less and is more preferably 100° C./sec. or less. The target temperature during cooling is preferably as low as possible. Specifically, the target temperature during cooling is preferably 100° C. or less.

Performing Heating to 400° C. or More and 750° C. or Less, Followed by Holding for 60 Seconds or More, and Subsequently Performing Cooling It is necessary to perform heating (reheating) to 400° C. or more in order to temper the martensite to form tempered martensite. It is preferable to perform heating to 550° C. or more. Performing tempering at a temperature exceeding 750° C. may cause a part of the steel microstructure to transform into austenite, which increases the amounts of hard untempered martensite and austenite that occur after cooling. Accordingly, heating to 750° C. or less is performed. It is preferable to perform heating to 720° C. or less. It is necessary to perform holding for 60 seconds or more in order to temper the container uniformly in the wall-thickness (i.e., plate-thickness) direction. The holding time is preferably 1800 seconds or more. In order to increase the amount of precipitate, it is preferable to perform tempering at 550° C. or more and 720° C. or less for 1800 seconds or more. The holding time is preferably 3 hours or less because an excessively long holding time may increase the cost.

Example 1

Molten steels having the compositions shown in Table 1 were each formed into a steel plate having a thickness of 25 mm under the specific conditions shown in Table 2. The molten steels were also each formed into a steel pipe having a thickness of 25 mm under the specific conditions shown in Table 3. Note that the "Working ratio" in Table 2 (where the product type is "Steel plate") refers to rolling reduction ratio, while the "Working ratio" in Table 3 (where the product type is "Steel pipe") refers to pipe-expanding ratio. The "Cooling rate" refers to the average cooling rate from the finishing temperature to 350° C. Cooling was performed until the temperature reached 350° C. or less. The "Reheating temperature" in Tables 2 and 3 refers to a temperature at which heating (reheating) was performed after cooling was performed at the cooling rate. The "Holding time" refers to a holding time during reheating.

The steel materials having the compositions shown in Table 1 were each formed into a steel plate, a steel pipe, or a container having a plate thickness or a wall thickness of 25 mm under the specific conditions shown in Table 4. In the case where the product type was "Container", the steel pipe having the specific composition shown in Table 1 was used as a steel material. The steel material was formed into a container, and the container was heated to the specific heating temperature shown in Table 4. The "Cooling rate" in Table 4 refers to the average cooling rate over the heating temperature to 350° C. except for the samples in which the cooling termination temperature exceeded 350° C.; in the samples in which the cooling termination temperature exceeded 350° C., the "Cooling rate" refers to the average cooling rate over the heating temperature to the cooling termination temperature. The "Reheating temperature" in Table 4 refers to a temperature at which heating (reheating) was performed after cooling was performed at the cooling rate. The "Initial grain diameter of steel material" in Table 4 refers to the average grain diameter determined from an image of the microstructure formed by performing saturated picric acid etching.

The steel plates, steel pipes, and containers prepared under the respective conditions shown in Tables 2, 3, and 4 were examined in terms of steel microstructure and tensile property and subjected to a fatigue crack propagation test in hydrogen at 110 MPa. Tables 2, 3, and 4 summarize the results. In Table 4, the product type of each sample, that is, "Steel plate", "Steel pipe", or "Container", is described. The same results were obtained regardless of the product type because the raw material was heated to 800° C. or more, that is, an austenite-single phase region, subsequently cooled, and subjected to a heat treatment. Specifically, performing heating to an austenite single-phase region caused a steel microstructure to be transformed into austenite. Therefore, the thermal history of the raw material which was recorded subsequent to heating to the austenite single-phase region greatly affected the steel microstructure regardless of the history of the raw material which was recorded prior to heating to the austenite single-phase region. Thus, the same results were obtained regardless of the product type. Material tests and material property evaluations were conducted in the following manner.

(1) Steel Microstructure

An electron scanning microscope (SEM) image of a cross section of the steel plate or steel pipe which was parallel to the rolling direction was captured at the ¼-thickness position at an appropriate magnification of 1000 to 3000 times in order to observe tempered martensite, ferrite, bainite, and pearlite. The ferrite phase, the bainite phase, the pearlite phase, and cementite were visually distinguished in order to determine the microstructures. In order to determine the fractions of the microstructures, the above-described SEM image was subjected to an image analysis to calculate the volume fraction of each phase. Portions other than the above-described phases were considered to be hard untempered martensite or austenite. In the case where the product type was "Container", the above-described examination was conducted in the direction of the steel material constituting the container.

In order to determine the size and number of the precipitate particles, a transmission electron microscope (TEM) sample at the ¼-thickness position was prepared by a thin-film method, a precipitate formed at tempered martensite portions was observed by a transmission method at a magnification of 10000 to 300000 times, and the diameters of the precipitate particles and the density of the precipitate particles having a diameter of 100 nm or less were measured. The precipitate density was calculated over an area of 1 $\mu m^2$ or more. The diameters of the precipitate particles were measured by a method of section. Whether the precipitate included one or more elements selected from Ti, Nb, and V and one or more elements selected from carbon and nitrogen was determined using an energy-dispersive X-ray spectroscopy system (EDX).

The grain diameter of prior austenite included in the product (i.e., grain diameter of prior-gamma included in the microstructure) was determined by performing saturated picric acid etching.

(2) Tensile Property

A tensile test conforming to JIS Z2241 was conducted using a No. 5 test piece described in JIS Z2201 (1980) in a longitudinal direction (tensile direction) that was the rolling direction of the steel plate or the steel pipe in order to make an evaluation. In the case where the product type was "Container", the above-described examination was conducted in the direction of the steel material constituting the container.

(3) Fatigue Crack Propagation Test

A fatigue crack propagation test was conducted in accordance with ASTM 5647 using compact tension specimens (CT specimens) in order to determine fatigue crack propagation rate. The test specimens were taken at a position of t/2 (t: plate thickness) of the steel material so as to have a thickness of 10 mm. Both surfaces of a crack propagation portion were subjected to mirror polishing. In the case where the product type was "Steel plate" or "Steel pipe", the examination was conducted using a test specimen taken so that the fatigue cracks propagated in a direction perpendicular to the rolling direction when a tensile or compression load was applied in the rolling direction. In the case where the product type was "Container", the examination was conducted as in the cases of "Steel plate" and "Steel pipe" by applying a tensile or compression load in the rolling direction of the steel material constituting the container. The stress ratio was set to minus one. The fatigue crack propagation test was conducted as described above, and a fatigue crack propagation rate at $\Delta K=25$ MPa·m$^{1/2}$ was determined. Furthermore, the C-value was determined on the basis of Paris' law $da/dN=\log(C(\Delta K)^m)$ (where C and m are constants primarily based on the material used) using data having a stress intensity factor range $\Delta K$ of 20 to 50 MPa·m$^{1/2}$, which is a stable growth region in which Paris' law holds.

As summarized in Tables 2, 3, and 4, in the invention examples, 700 MPa≤TS<900 MPa was satisfied when 0.05%≤the C content<0.21%, and TS≥900 MPa was satisfied when 0.21%≤the C content≤0.60%. In the invention examples, the C-value determined in the fatigue crack propagation test achieved C≤8.0×10$^{-11}$, and a fatigue crack propagation rate at $\Delta K=25$ MPa·m$^{1/2}$ achieved 1.0×10$^{-6}$ m/cycle or less.

TABLE 1

| Steel type | Chemical composition (mass %) | | | | | | | | | | |
|---|---|---|---|---|---|---|---|---|---|---|---|
| | C | Si | Mn | P | S | Al | N | Ti | Nb | V | B |
| LA | 0.10 | 0.26 | 0.61 | 0.011 | 0.0014 | 0.03 | 0.003 | 0.09 | — | — | 0.0014 |
| LB | 0.12 | 0.24 | 0.54 | 0.004 | 0.0012 | 0.04 | 0.002 | — | 0.12 | — | — |
| LC | 0.15 | 0.22 | 1.32 | 0.010 | 0.0020 | 0.02 | 0.003 | 0.07 | 0.06 | — | — |
| LD | 0.17 | 0.06 | 0.41 | 0.021 | 0.0017 | 0.03 | 0.002 | 0.09 | 0.02 | — | 0.0022 |
| LE | 0.20 | 0.83 | 0.53 | 0.022 | 0.0025 | 0.02 | 0.003 | 0.07 | 0.03 | — | — |
| LF | 0.07 | 0.24 | 1.38 | 0.006 | 0.0014 | 0.04 | 0.004 | 0.08 | 0.06 | — | — |
| LG | 0.18 | 0.39 | 2.36 | 0.011 | 0.0008 | 0.03 | 0.002 | 0.05 | 0.02 | — | 0.0023 |
| LH | 0.13 | 0.44 | 0.69 | 0.010 | 0.0009 | 0.04 | 0.004 | — | 0.05 | — | 0.0012 |
| LI | 0.11 | 0.34 | 0.81 | 0.009 | 0.0012 | 0.02 | 0.003 | 0.12 | — | — | 0.0011 |
| LJ | 0.17 | 0.98 | 2.12 | 0.014 | 0.0009 | 0.31 | 0.003 | — | 0.04 | — | 0.0008 |
| LK | 0.19 | 0.55 | 1.75 | 0.014 | 0.0032 | 0.02 | 0.004 | — | — | 0.04 | 0.0015 |
| <u>LL</u> | <u>0.03</u> | 0.21 | 0.81 | 0.020 | 0.0033 | 0.03 | 0.003 | 0.03 | 0.03 | — | — |
| LM | 0.25 | 0.25 | 0.67 | 0.012 | 0.0011 | 0.03 | 0.003 | — | 0.06 | — | — |
| <u>LN</u> | 0.13 | 0.31 | <u>3.23</u> | 0.015 | 0.0015 | 0.03 | 0.003 | 0.04 | — | — | 0.0010 |
| <u>LO</u> | 0.14 | 0.24 | 0.33 | <u>0.075</u> | 0.0024 | 0.04 | 0.002 | — | 0.06 | — | — |
| <u>LP</u> | 0.15 | 0.27 | 0.95 | 0.010 | <u>0.0180</u> | 0.02 | 0.004 | — | — | — | 0.0014 |
| LQ | 0.09 | 0.27 | 0.82 | 0.013 | 0.0020 | 0.04 | 0.002 | 0.05 | — | — | 0.0016 |
| LR | 0.16 | 0.22 | 1.38 | 0.015 | 0.0029 | 0.06 | 0.003 | 0.01 | 0.02 | — | — |

| Steel type | Chemical composition (mass %) | | | | | | | | | | Remark |
|---|---|---|---|---|---|---|---|---|---|---|---|
| | Mo | Cr | Ni | Cu | Ca | REM | Mg | Zr | Sb | W | |
| LA | 0.88 | 0.97 | — | — | — | — | — | — | — | — | Within the range of invention |
| LB | 0.63 | 1.11 | — | — | — | — | — | — | — | — | Within the range of invention |
| LC | 0.58 | 1.22 | — | — | — | — | — | — | — | — | Within the range of invention |
| LD | — | — | — | — | — | — | — | — | — | — | Within the range of invention |
| LE | — | 2.35 | — | — | — | — | — | — | — | — | Within the range of invention |
| LF | 0.33 | — | — | — | — | — | — | — | — | — | Within the range of invention |
| LG | — | 0.74 | — | — | 0.002 | — | — | — | — | — | Within the range of invention |
| LH | 0.70 | 1.08 | — | 0.09 | — | — | — | — | — | — | Within the range of invention |
| LI | 1.05 | 0.91 | 0.05 | — | — | 0.002 (La) | — | — | — | — | Within the range of invention |
| LJ | 0.58 | 0.54 | — | — | — | — | 0.002 | — | — | — | Within the range of invention |
| LK | 0.99 | 1.46 | — | — | — | — | — | 0.002 | — | — | Within the range of invention |
| <u>LL</u> | 0.53 | — | — | — | — | — | — | — | — | — | Out of the range of invention |
| LM | 0.65 | 1.04 | — | — | — | — | — | — | — | — | Within the range of invention |
| <u>LN</u> | 0.55 | 0.85 | — | — | — | — | — | — | — | — | Out of the range of invention |
| <u>LO</u> | 1.28 | 0.92 | — | — | — | — | — | — | — | — | Out of the range of invention |
| <u>LP</u> | 0.32 | — | — | — | — | — | — | — | — | — | Out of the range of invention |
| LQ | 0.80 | 0.99 | — | — | — | — | — | — | 0.0009 | — | Within the range of invention |
| LR | — | 0.65 | — | — | — | — | — | — | — | 0.03 | Within the range of invention |

TABLE 2

| Sample No. | Steel type | Product type | Heating temperature of steel (° C.) | Finishing temperature (° C.) | Working ratio from 950° C. to finishing temperature (%) | Cooling rate (° C./sec) | Reheating temperature (° C.) | Holding time (second) |
|---|---|---|---|---|---|---|---|---|
| L1 | LA | Steel plate | 1230 | 920 | 10 | 12 | 600 | 2700 |
| L2 | LA | Steel plate | <u>1050</u> | 920 | 10 | 12 | 600 | 2700 |
| L3 | LB | Steel plate | 1150 | 910 | 15 | 30 | 580 | 3600 |
| L4 | LB | Steel plate | 1150 | <u>770</u> | 15 | 30 | 580 | 3600 |

TABLE 2-continued

| Sample No. | Steel type | Product type | Heating temperature of steel (° C.) | Finishing temperature (° C.) | Working ratio from 950° C. to finishing temperature (%) | Cooling rate (° C./sec) | Reheating temperature (° C.) | Holding time (second) |
|---|---|---|---|---|---|---|---|---|
| L5 | LC | Steel plate | 1230 | 900 | 12 | 15 | 630 | 1800 |
| L6 | LC | Steel plate | 1230 | 900 | 12 | <u>0.1</u> | 630 | 1800 |
| L7 | LD | Steel plate | 1250 | 850 | 8 | 20 | 650 | 2400 |
| L8 | LD | Steel plate | 1250 | 850 | 8 | 20 | <u>300</u> | 2400 |
| L9 | LD | Steel plate | 1250 | 850 | 8 | 20 | <u>780</u> | 2400 |
| L10 | LE | Steel plate | 1280 | 910 | 10 | 12 | 700 | 1800 |
| L11 | LE | Steel plate | 1280 | 910 | 10 | 12 | 700 | <u>30</u> |
| L12 | LF | Steel plate | 1150 | 890 | 12 | 30 | 580 | 3000 |
| L13 | LG | Steel plate | 1220 | 920 | 19 | 100 | 720 | 600 |
| L14 | LH | Steel plate | 1200 | 940 | 17 | 50 | 600 | 2100 |
| L15 | LI | Steel plate | 1230 | 900 | 5 | 30 | 580 | 2400 |
| L16 | LJ | Steel plate | 1250 | 890 | 7 | 20 | 730 | 300 |
| L17 | LK | Steel plate | 1300 | 880 | 3 | 100 | 480 | 7200 |
| L18 | <u>LL</u> | Steel plate | 1200 | 900 | 10 | 15 | 620 | 1800 |
| L19 | LM | Steel plate | 1150 | 900 | 15 | 20 | 620 | 2700 |
| L20 | <u>LN</u> | Steel plate | 1220 | 900 | 15 | 30 | 640 | 1800 |
| L21 | <u>LO</u> | Steel plate | 1200 | 920 | 15 | 30 | 640 | 2400 |
| L22 | <u>LP</u> | Steel plate | 1220 | 880 | 10 | 40 | 550 | 3600 |
| L23 | LQ | Steel plate | 1200 | 880 | 15 | 20 | 550 | 3600 |
| L24 | LR | Steel plate | 1180 | 920 | 10 | 25 | 580 | 3000 |

| Sample No. | TS (MPa) | Volume fraction of tempered martensite (%) | Average diameter of precipitate (nm) | Density of precipitate (particles/μm²) | Grain diameter of prior gamma in microstructure (μm) | C/10⁻¹¹ | da/dN/10⁻⁶ (m/cycle) | Remark |
|---|---|---|---|---|---|---|---|---|
| L1 | 749 | 100 | 10 | 164 | 11.9 | 6.1 | 0.71 | Invention example |
| L2 | 692 | 100 | 10 | <u>7</u> | 9.7 | 10.5 | 1.49 | Comparative example |
| L3 | 783 | 100 | 8 | 172 | 10.4 | 6.2 | 0.72 | Invention example |
| L4 | 792 | <u>86</u> | 8 | 169 | <u>2.4</u> | 17.1 | 1.72 | Comparative example |
| L5 | 816 | 100 | 12 | 134 | 10.3 | 6.5 | 0.73 | Invention example |
| L6 | 655 | <u>74</u> | 12 | 120 | 11.3 | 10.9 | 1.15 | Comparative example |
| L7 | 845 | 100 | 16 | 108 | 8.3 | 7.1 | 0.84 | Invention example |
| L8 | 1014 | 100 | 3 | <u>18</u> | 8.4 | 69.2 | 7.01 | Comparative example |
| L9 | 892 | <u>76</u> | 19 | 91 | 8.2 | 61.1 | 6.24 | Comparative example |
| L10 | 795 | 100 | 18 | 106 | 9.4 | 7.2 | 0.86 | Invention example |
| L11 | 1021 | 100 | 7 | <u>31</u> | 9.4 | 39.4 | 3.50 | Comparative example |
| L12 | 720 | 97 | 8 | 161 | 8.6 | 7.4 | 0.84 | Invention example |
| L13 | 793 | 99 | 19 | 127 | 6.3 | 7.5 | 0.86 | Invention example |
| L14 | 825 | 100 | 11 | 158 | 15.6 | 6.0 | 0.74 | Invention example |
| L15 | 813 | 100 | 9 | 165 | 10.3 | 6.5 | 0.72 | Invention example |
| L16 | 764 | 100 | 21 | 195 | 9.1 | 7.7 | 0.89 | Invention example |
| L17 | 887 | 100 | 5 | 81 | 13.3 | 7.8 | 0.84 | Invention example |
| L18 | 642 | 100 | 13 | <u>42</u> | 14.2 | 11.4 | 1.27 | Comparative example |
| L19 | 983 | 100 | 13 | 124 | 10.6 | 7.0 | 0.72 | Invention example |
| L20 | 788 | <u>92</u> | 15 | 106 | 7.6 | 21.1 | 2.34 | Comparative example |
| L21 | 806 | 100 | 16 | 122 | 11.6 | 36.5 | 3.78 | Comparative example |
| L22 | 824 | 100 | 6 | 149 | 16.4 | 31.2 | 3.87 | Comparative example |
| L23 | 753 | 100 | 7 | 149 | 9.5 | 6.8 | 0.72 | Invention example |
| L24 | 830 | 100 | 9 | 110 | 9.4 | 7.4 | 0.83 | Invention example |

Note)
"Density of precipitate" refers to the density of the particles of precipitate having a diameter of 100 nm or less which include one or more elements selected from Ti, Nb, and V and one or more elements selected from carbon and nitrogen.

TABLE 3

| Sample No. | Steel type | Product type | Heating temperature of steel (° C.) | Finishing temperature (° C.) | Working ratio from 950° C. to finishing temperature (%) | Cooling rate (° C./sec) | Reheating temperature (° C.) | Holding time (second) |
|---|---|---|---|---|---|---|---|---|
| L25 | LA | Steel pipe | 1230 | 920 | 11 | 15 | 600 | 2700 |
| L26 | LA | Steel pipe | <u>1050</u> | 920 | 11 | 15 | 600 | 2700 |
| L27 | LB | Steel pipe | 1150 | 910 | 14 | 35 | 580 | 3600 |
| L28 | LB | Steel pipe | 1150 | <u>770</u> | 14 | 35 | 580 | 3600 |
| L29 | LC | Steel pipe | 1230 | 900 | 10 | 20 | 630 | 1800 |
| L30 | LC | Steel pipe | 1230 | 900 | 10 | <u>0.2</u> | 630 | 1800 |

TABLE 3-continued

| Sample No. | | | | | | | |
|---|---|---|---|---|---|---|---|
| L31 | LD | Steel pipe | 1250 | 850 | 7 | 15 | 650 | 2400 |
| L32 | LD | Steel pipe | 1250 | 850 | 7 | 15 | <u>300</u> | 2400 |
| L33 | LD | Steel pipe | 1250 | 850 | 7 | 15 | <u>780</u> | 2400 |
| L34 | LE | Steel pipe | 1280 | 910 | 9 | 10 | 700 | 1800 |
| L35 | LE | Steel pipe | 1280 | 910 | 9 | 10 | 700 | <u>30</u> |
| L36 | LF | Steel pipe | 1150 | 890 | 13 | 30 | 580 | 3000 |
| L37 | LG | Steel pipe | 1220 | 920 | 17 | 100 | 720 | 600 |
| L38 | LH | Steel pipe | 1200 | 940 | 18 | 50 | 600 | 2100 |
| L39 | LI | Steel pipe | 1230 | 900 | 4 | 30 | 580 | 2400 |
| L40 | LI | Steel pipe | 1250 | 890 | 6 | 15 | 730 | 300 |
| L41 | LK | Steel pipe | 1300 | 880 | 2 | 100 | 480 | 7200 |
| L42 | <u>LL</u> | Steel pipe | 1200 | 900 | 10 | 15 | 620 | 1800 |
| L43 | LM | Steel pipe | 1150 | 900 | 15 | 20 | 620 | 2700 |
| L44 | <u>LN</u> | Steel pipe | 1220 | 900 | 15 | 30 | 640 | 1800 |
| L45 | <u>LO</u> | Steel pipe | 1200 | 920 | 15 | 30 | 640 | 2400 |
| L46 | <u>LP</u> | Steel pipe | 1220 | 880 | 10 | 40 | 550 | 3600 |

| Sample No. | TS (MPa) | Volume fraction of tempered martensite (%) | Average diameter of precipitate (nm) | Density of precipitate (particles/ $\mu m^2$) | Grain diameter of prior gamma in micro-structure ($\mu m$) | C/ $10^{-11}$ | da/dN/$10^{-6}$ (m/cycle) | Remark |
|---|---|---|---|---|---|---|---|---|
| L25 | 764 | 100 | 11 | 152 | 12.1 | 6.2 | 0.73 | Invention example |
| L26 | 724 | 100 | 11 | <u>5</u> | 10.0 | 10.7 | 1.50 | Comparative example |
| L27 | 794 | 100 | 9 | 157 | 10.7 | 6.3 | 0.74 | Invention example |
| L28 | 824 | <u>89</u> | 9 | 160 | <u>2.4</u> | 17.0 | 1.70 | Comparative example |
| L29 | 822 | 100 | 14 | 128 | 10.5 | 6.7 | 0.74 | Invention example |
| L30 | 664 | <u>83</u> | 14 | 115 | 11.4 | 11.0 | 1.14 | Comparative example |
| L31 | 842 | 100 | 18 | 101 | 7.8 | 7.2 | 0.83 | Invention example |
| L32 | 1007 | 100 | 5 | <u>16</u> | 8.2 | 69.1 | 7.00 | Comparative example |
| L33 | 871 | <u>74</u> | 20 | 84 | 8.5 | 61.3 | 6.26 | Comparative example |
| L34 | 781 | 100 | 20 | 94 | 9.8 | 7.3 | 0.87 | Invention example |
| L35 | 1000 | 100 | 10 | <u>28</u> | 9.5 | 39.6 | 3.51 | Comparative example |
| L36 | 742 | 98 | 7 | 179 | 8.8 | 7.5 | 0.86 | Invention example |
| L37 | 806 | 99 | 22 | 111 | 6.3 | 7.6 | 0.87 | Invention example |
| L38 | 810 | 100 | 9 | 169 | 15.9 | 6.6 | 0.76 | Invention example |
| L39 | 821 | 100 | 10 | 157 | 10.0 | 6.4 | 0.74 | Invention example |
| L40 | 774. | 100 | 24 | 184 | 9.3 | 7.8 | 0.90 | Invention example |
| L41 | 891 | 100 | 7 | 73 | 13.2 | 7.9 | 0.83 | Invention example |
| L42 | 632 | 100 | 15 | <u>39</u> | 14.3 | 11.3 | 1.26 | Comparative example |
| L43 | 954 | 100 | 14 | 120 | 13.0 | 6.6 | 0.73 | Invention example |

TABLE 3-continued

| | | | | | | | | |
|---|---|---|---|---|---|---|---|---|
| L44 | 781 | 93 | 15 | 107 | 7.4 | 21.3 | 2.35 | Comparative example |
| L45 | 792 | 100 | 18 | 115 | 11.8 | 36.3 | 3.80 | Comparative example |
| L46 | 801 | 100 | 8 | 142 | 16.8 | 31.3 | 3.88 | Comparative example |

Note)
"Density of precipitate" refers to the density of the particles of precipitate having a diameter of 100 nm or less which include one or more elements selected from Ti, Nb and V and one or more elements selected from carbon and nitrogen.

TABLE 4

| Sample No. | Steel type | Product type | Initial grain diameter of steel material (μm) | Heating temperature of steel material or container (° C.) | Holding time (heating time) (second) | Cooling rate (° C./sec) | Cooling termination temperature (° C.) | Reheating temperature (° C.) | Holding time (during reheating) (second) |
|---|---|---|---|---|---|---|---|---|---|
| L47 | LA | Steel plate | 6.2 | 900 | 300 | 30 | 50 | 580 | 2400 |
| L48 | LA | Steel plate | 2.1 | 900 | 300 | 30 | 50 | 580 | 2400 |
| L49 | LB | Steel pipe | 7.3 | 940 | 1200 | 40 | 35 | 620 | 1800 |
| L50 | LB | Steel pipe | 7.3 | 750 | 1200 | 40 | 35 | 620 | 1800 |
| L51 | LC | Container | 8.5 | 920 | 1800 | 100 | 75 | 570 | 3600 |
| L52 | LC | Container | 8.5 | 920 | 1800 | 0.2 | 75 | 570 | 3600 |
| L53 | LD | Steel plate | 4.2 | 850 | 900 | 50 | 25 | 600 | 7200 |
| L54 | LD | Steel plate | 4.2 | 850 | 900 | 50 | 400 | 600 | 7200 |
| L55 | LE | Steel pipe | 6.4 | 820 | 600 | 60 | 100 | 650 | 3600 |
| L56 | LE | Steel pipe | 6.4 | 820 | 600 | 60 | 100 | 300 | 3600 |
| L57 | LE | Steel pipe | 6.4 | 820 | 600 | 60 | 100 | 780 | 3600 |
| L58 | LF | Container | 10.2 | 880 | 1500 | 80 | 30 | 500 | 3600 |
| L59 | LF | Container | 10.2 | 880 | 1500 | 80 | 30 | 500 | 5 |
| L60 | LG | Steel plate | 9.3 | 860 | 2400 | 250 | 200 | 700 | 600 |
| L61 | LH | Steel pipe | 9.3 | 950 | 3600 | 30 | 25 | 590 | 2700 |
| L62 | LI | Container | 11.3 | 930 | 1800 | 80 | 25 | 620 | 1800 |
| L63 | LJ | Steel plate | 7.4 | 840 | 1800 | 150 | 300 | 720 | 600 |
| L64 | LK | Steel pipe | 3.7 | 980 | 1800 | 60 | 25 | 460 | 9000 |
| L65 | LL | Container | 5.9 | 900 | 1800 | 50 | 50 | 600 | 3600 |
| L66 | LM | Steel plate | 5.1 | 880 | 1800 | 100 | 50 | 500 | 3600 |
| L67 | LN | Steel pipe | 9.6 | 900 | 1800 | 50 | 25 | 650 | 3600 |
| L68 | LO | Container | 8.3 | 920 | 1800 | 30 | 50 | 600 | 3600 |
| L69 | LP | Steel plate | 11.6 | 900 | 1800 | 50 | 25 | 550 | 3600 |

| Sample No. | TS (MPa) | Volume fraction of tempered martensite (%) | Average diameter of precipitate (nm) | Density of precipitate (particles/μm$^2$) | Grain diameter of prior gamma in microstructure (μm) | $C/10^{-11}$ | da/d N/$10^{-6}$ (m/cycle) | Remark |
|---|---|---|---|---|---|---|---|---|
| L47 | 783 | 100 | 9 | 145 | 10.5 | 6.4 | 0.72 | Invention example |
| L48 | 815 | 92 | 10 | 140 | 7.2 | 13.5 | 1.38 | Comparative example |
| L49 | 752 | 100 | 8 | 159 | 10.8 | 6.6 | 0.75 | Invention example |
| L50 | 803 | 88 | 10 | 164 | 4.3 | 19.5 | 2.23 | Comparative example |
| L51 | 823 | 100 | 12 | 181 | 10.2 | 6.5 | 0.74 | Invention example |
| L52 | 654 | 68 | 10 | 176 | 11.1 | 21.5 | 2.31 | Comparative example |
| L53 | 864 | 100 | 14 | 173 | 7.4 | 7.4 | 0.82 | Invention example |
| L54 | 821 | 75 | 25 | 43 | 7.6 | 32.6 | 3.41 | Comparative example |
| L55 | 824 | 100 | 18 | 131 | 7.8 | 7.5 | 0.87 | Invention example |
| L56 | 1034 | 25 | 9 | 202 | 7.9 | 35.7 | 3.74 | Comparative example |
| L57 | 893 | 54 | 36 | 68 | 7.8 | 24.3 | 2.63 | Comparative example |
| L58 | 759 | 98 | 8 | 142 | 11.6 | 7.3 | 0.85 | Invention example |
| L59 | 923 | 98 | 3 | 25 | 11.6 | 26.5 | 2.89 | Comparative example |
| L60 | 832 | 100 | 17 | 144 | 10.4 | 7.8 | 0.92 | Invention example |
| L61 | 802 | 100 | 10 | 171 | 11.0 | 6.2 | 0.71 | Invention example |
| L62 | 763 | 100 | 10 | 141 | 12.2 | 6.6 | 0.77 | Invention example |
| L63 | 782 | 100 | 19 | 181 | 8.3 | 7.8 | 0.92 | Invention example |
| L64 | 883 | 100 | 6 | 85 | 7.3 | 8.0 | 0.86 | Invention example |
| L65 | 631 | 100 | 12 | 38 | 10.2 | 11.6 | 1.35 | Comparative example |

TABLE 4-continued

| | | | | | | | | |
|---|---|---|---|---|---|---|---|---|
| L66 | 963 | 100 | 10 | 149 | 8.3 | 6.8 | 0.71 | Invention example |
| L67 | 825 | 93 | 15 | 103 | 10.9 | 21.8 | 2.74 | Comparative example |
| L68 | 927 | 100 | 14 | 136 | 9.6 | 36.9 | 3.85 | Comparative example |
| L69 | 822 | 100 | 9 | 152 | 11.7 | 31.3 | 3.98 | Comparative example |

Note 1)
"Initial grain diameter of steel material" refers to an average grain diameter observed in a microstructure obtained by saturated picric acid etching.

Note 2)
"Density of precipitate" refers to the density of the particles of precipitate having a diameter of 100 nm or less which include one or more elements selected from Ti, Nb, and V and one or more elements selected from carbon and nitrogen.

Example 2

Molten steels having the compositions shown in Table 5 (Tables 5-1 and 5-2) were each formed into a steel plate having a thickness of 25 mm under the specific conditions shown in Table 6 (Tables 6-1 and 6-2). The molten steels were also each formed into a steel pipe having a thickness of 25 mm under the specific conditions shown in Table 7. Note that the "Working ratio" in Table 6 (where the product type is "Steel plate") refers to rolling reduction ratio, while the "Working ratio" in Table 7 (where the product type is "Steel pipe") refers to pipe-expanding ratio. The "Cooling rate" refers to the average cooling rate from the finishing temperature to 350° C. Cooling was performed until the temperature reached 350° C. or less. The "Reheating temperature" in Tables 6 and 7 refers to a temperature at which heating (reheating) was performed after cooling was performed at the cooling rate. The "Holding time" refers to a holding time during reheating.

The steel materials having the compositions shown in Table 5 were each formed into a steel plate, a steel pipe, or a container having a plate thickness or a wall thickness of 25 mm under the specific conditions shown in Table 8. In the case where the product type was "Container", the steel pipe having the specific composition shown in Table 5 was used as a steel material. The steel material was formed into a container, and the container was heated to the specific heating temperature shown in Table 8. The "Cooling rate" in Table 8 refers to the average cooling rate from the heating temperature to 350° C. except for the samples in which the cooling termination temperature exceeded 350° C.; in the samples in which the cooling termination temperature exceeded 350° C., the "Cooling rate" refers to the average cooling rate from the heating temperature to the cooling termination temperature. The "Reheating temperature" in Table 8 refers to a temperature at which heating (reheating) was performed after cooling was performed at the cooling rate. The "Initial grain diameter of steel material" in Table 8 refers to the average grain diameter determined from an image of the microstructure formed by performing saturated picric acid etching.

The steel plates, steel pipes, and containers prepared under the respective conditions shown in Tables 6, 7, and 8 were examined in terms of steel microstructure and tensile property and subjected to a fatigue crack propagation test in hydrogen at 110 MPa. Tables 6, 7, and 8 summarize the results. In Table 8, the product type of each sample, that is, "Steel plate", "Steel pipe", or "Container", is described. The same results were obtained regardless of the product type because the raw material was heated to 800° C. or more, that is, an austenite-single phase region, subsequently cooled, and subjected to a heat treatment. Specifically, performing heating to an austenite single-phase region caused a steel microstructure to be transformed into austenite. Therefore, the thermal history of the raw material which was recorded subsequent to heating to the austenite single-phase region greatly affected the steel microstructure regardless of the history of the raw material which was recorded prior to heating to the austenite single-phase region. Thus, the same results were obtained regardless of the product type. Material tests and material property evaluations were conducted in the following manner as in Example 1.

(1) Steel Microstructure

An electron scanning microscope (SEM) image of a cross section of the steel plate or steel pipe which was parallel to the rolling direction was captured at the ¼-thickness position at an appropriate magnification of 1000 to 3000 times in order to observe tempered martensite, ferrite, bainite, and pearlite. The ferrite phase, the bainite phase, the pearlite phase, and cementite were visually distinguished in order to determine the microstructures. In order to determine the fractions of the microstructures, the above-described SEM image was subjected to an image analysis to calculate the volume fraction of each phase. Portions other than the above-described phases were considered to be hard untempered martensite or austenite. In the case where the product type was "Container", the above-described examination was conducted in the direction of the steel material constituting the container.

In order to determine the size and number of the precipitate particles, a transmission electron microscope (TEM) sample at the ¼-thickness position was prepared by a thin-film method, a precipitate formed at tempered martensite portions was observed by a transmission method at a magnification of 10000 to 300000 times, and the grain diameters of the precipitate particles and the density of the precipitate particles having a diameter of 100 nm or less were measured. The precipitate density was calculated over an area of 1 μm² or more. The diameters of the precipitate particles were measured by a method of section. Whether the precipitate included one or more elements selected from Ti, Nb, and V and one or more elements selected from carbon and nitrogen was determined using an energy-dispersive X-ray spectroscopy system (EDX).

The grain diameter of prior austenite included in the product (i.e., grain diameter of prior-gamma included in the microstructure) was determined by performing saturated picric acid etching.

(2) Tensile Property

A tensile test conforming to JIS 22241 was conducted using a No. 5 test piece described in JIS Z2201 (1980) in a longitudinal direction (tensile direction) that was the rolling direction of the steel plate or the steel pipe in order to make an evaluation. In the case where the product type was "Container", the above-described examination was conducted in the direction of the steel material constituting the container.

(3) Fatigue Crack Propagation Test

A fatigue crack propagation test was conducted in accordance with ASTM E647 using compact tension specimens (CT specimens) in order to determine fatigue crack propagation rate. The test specimens were taken at a position of t/2 (t: plate thickness) of the steel material so as to have a thickness of 10 mm. Both surfaces of a crack propagation portion were subjected to mirror polishing. In the case where the product type was "Steel plate" or "Steel pipe", the examination was conducted using a test specimen taken so that the fatigue cracks propagated in a direction perpendicular to the rolling direction when a tensile or compression load was applied in the rolling direction. In the case where the product type was "Container", the examination was conducted as in the cases of "Steel plate" and "Steel pipe" by applying a tensile or compression load in the rolling direction of the steel material constituting the container. The stress ratio was set to minus one. The fatigue crack propagation test was conducted as described above, and a fatigue crack propagation rate at $\Delta K=25$ MPa·m$^{1/2}$ was determined. Furthermore, the C-value was determined on the basis of Paris' law $da/dN=\log(C(\Delta K)^m)$ (where C and m are constants primarily based on the material used) using data having a stress intensity factor range $\Delta K$ of 20 to 50 MPa·m$^{1/2}$, which is a stable growth region in which Paris' law holds.

As summarized in Tables 6, 7, and 8, in the invention examples, 700 MPa≤TS<900 MPa was satisfied when 0.05%≤the C content<0.21%, and TS≥900 MPa was satisfied when 0.21%≤the C content≤0.60%. In the invention examples, the C-value determined in the fatigue crack propagation test achieved C≤8.0×10$^{-11}$, and a fatigue crack propagation rate at $\Delta K=25$ MPa·m$^{1/2}$ achieved 1.0×10$^{-6}$ m/cycle or less.

TABLE 5-1

| Steel type | Chemical composition (mass %) | | | | | | | | | | |
|---|---|---|---|---|---|---|---|---|---|---|---|
| | C | Si | Mn | P | S | Al | N | Ti | Nb | V | B |
| HA | 0.23 | 0.20 | 0.55 | 0.003 | 0.0018 | 0.04 | 0.002 | 0.03 | — | — | 0.0011 |
| HB | 0.25 | 0.25 | 0.67 | 0.012 | 0.0011 | 0.03 | 0.003 | — | 0.06 | — | — |
| HC | 0.28 | 0.27 | 1.21 | 0.010 | 0.0024 | 0.02 | 0.002 | 0.05 | 0.03 | — | — |
| HD | 0.35 | 0.05 | 0.45 | 0.024 | 0.0011 | 0.04 | 0.003 | 0.10 | 0.01 | — | 0.0025 |
| HE | 0.45 | 0.73 | 0.56 | 0.009 | 0.0032 | 0.02 | 0.004 | 0.07 | 0.02 | — | — |
| HF | 0.52 | 0.22 | 1.42 | 0.010 | 0.0009 | 0.03 | 0.004 | 0.05 | 0.05 | — | — |
| HG | 0.58 | 0.24 | 0.35 | 0.006 | 0.0008 | 0.04 | 0.002 | 0.02 | 0.12 | 0.02 | 0.0021 |
| HH | 0.26 | 0.37 | 2.42 | 0.022 | 0.0018 | 0.02 | 0.003 | 0.03 | 0.04 | — | 0.0014 |
| HI | 0.27 | 0.42 | 0.74 | 0.011 | 0.0025 | 0.04 | 0.003 | — | 0.04 | — | 0.0012 |
| HJ | 0.36 | 0.36 | 0.83 | 0.012 | 0.0015 | 0.03 | 0.004 | 0.05 | — | — | 0.0009 |
| HK | 0.42 | 1.05 | 2.05 | 0.009 | 0.0009 | 0.54 | 0.003 | — | 0.03 | — | — |
| HL | 0.31 | 0.21 | 1.71 | 0.014 | 0.0020 | 0.02 | 0.002 | — | — | 0.03 | 0.0013 |
| HM | 0.18 | 0.22 | 0.84 | 0.015 | 0.0034 | 0.03 | 0.003 | 0.03 | 0.02 | — | — |
| <u>HN</u> | 0.26 | 0.34 | <u>3.14</u> | 0.021 | 0.0022 | 0.04 | 0.002 | 0.05 | — | — | 0.0011 |
| <u>HO</u> | 0.27 | 0.23 | 0.34 | <u>0.080</u> | 0.0015 | 0.03 | 0.003 | — | 0.06 | — | — |
| <u>HP</u> | 0.31 | 0.28 | 0.95 | 0.011 | <u>0.0150</u> | 0.04 | 0.004 | — | — | — | 0.0015 |
| HQ | 0.27 | 0.24 | 1.40 | 0.009 | 0.0015 | 0.03 | 0.003 | 0.05 | 0.02 | — | 0.0015 |
| HR | 0.32 | 0.19 | 0.99 | 0.008 | 0.0021 | 0.04 | 0.003 | 0.03 | 0.06 | 0.02 | 0.0010 |
| HS | 0.24 | 0.39 | 1.02 | 0.006 | 0.0012 | 0.03 | 0.004 | 0.02 | 0.03 | — | 0.0013 |

| Steel type | Chemical composition (mass %) | | | | | | | | | | |
|---|---|---|---|---|---|---|---|---|---|---|---|
| | Mo | Cr | Ni | Cu | Ca | REM | Mg | Zr | Sb | W | Remark |
| HA | 0.92 | 0.95 | — | — | — | — | — | — | — | — | Within the range of invention |
| HB | 0.65 | 1.04 | — | — | — | — | — | — | — | — | Within the range of invention |
| HC | 0.54 | 1.24 | — | — | — | — | — | — | — | — | Within the range of invention |
| HD | — | — | — | — | — | — | — | — | — | — | Within the range of invention |
| HE | — | 2.31 | — | — | — | — | — | — | — | — | Within the range of invention |
| HF | 0.31 | — | — | — | — | — | — | — | — | — | Within the range of invention |
| HG | 1.24 | — | 0.05 | — | — | — | — | — | — | — | Within the range of invention |
| HH | — | 0.69 | — | — | 0.002 | — | — | — | — | — | Within the range of invention |
| HI | 0.72 | 1.02 | — | 0.11 | — | — | — | — | — | — | Within the range of invention |
| HJ | 1.09 | 0.84 | — | — | — | 0.001 (Y) | — | — | — | — | Within the range of invention |
| HK | 0.55 | 0.57 | — | — | — | — | 0.002 | — | — | — | Within the range of invention |
| HL | 0.92 | 1.42 | — | — | — | — | — | 0.001 | — | — | Within the range of invention |
| HM | 0.51 | — | — | — | — | — | — | — | — | — | Within the range of invention |
| HN | 0.57 | 0.82 | — | — | — | — | — | — | — | — | Out of the range of invention |
| HO | 1.24 | 0.97 | — | — | — | — | — | — | — | — | Out of the range of invention |

TABLE 5-1-continued

| | | | | | | | | | | |
|---|---|---|---|---|---|---|---|---|---|---|
| HP | 0.37 | — | — | — | — | — | — | — | — | Out of the range of invention |
| HQ | 0.32 | — | 0.04 | — | 0.003 | — | — | — | — | Within the range of invention |
| HR | 0.64 | 0.19 | — | 0.05 | — | — | 0.001 | — | — | Within the range of invention |
| HS | — | 0.32 | — | — | — | 0.001 (La) | — | 0.001 | — | Within the range of invention |

TABLE 5-2

| Steel type | Chemical composition (mass %) | | | | | | | | | | |
|---|---|---|---|---|---|---|---|---|---|---|---|
| | C | Si | Mn | P | S | Al | N | Ti | Nb | V | B |
| HT | 0.34 | 0.21 | 1.16 | 0.012 | 0.0020 | 0.31 | 0.004 | 0.03 | — | — | 0.0021 |
| HU | 0.28 | 0.32 | 1.23 | 0.009 | 0.0016 | 0.05 | 0.003 | — | 0.03 | — | — |
| HV | 0.31 | 0.24 | 1.36 | 0.015 | 0.0024 | 0.04 | 0.002 | 0.02 | — | 0.03 | — |
| HW | 0.34 | 0.16 | 1.39 | 0.014 | 0.0025 | 0.03 | 0.004 | 0.06 | 0.04 | — | 0.0019 |
| HX | 0.28 | 0.08 | 1.49 | 0.013 | 0.0012 | 0.03 | 0.003 | — | 0.06 | — | 0.0008 |
| HY | 0.26 | 0.13 | 1.01 | 0.012 | 0.0007 | 0.02 | 0.004 | 0.02 | 0.05 | — | — |
| HZ | 0.23 | 0.42 | 1.46 | 0.014 | 0.0013 | 0.04 | 0.003 | 0.08 | — | — | 0.0029 |
| HAA | 0.32 | 0.20 | 0.77 | 0.010 | 0.0015 | 0.06 | 0.004 | 0.03 | 0.02 | — | 0.0043 |
| HAB | 0.40 | 1.24 | 1.85 | 0.020 | 0.0016 | 0.04 | 0.002 | 0.07 | 0.03 | — | 0.0006 |
| HAC | 0.33 | 0.44 | 1.46 | 0.014 | 0.0020 | 0.02 | 0.002 | — | 0.04 | — | 0.0022 |
| HAD | 0.35 | 0.37 | 0.52 | 0.013 | 0.0019 | 0.15 | 0.003 | 0.01 | 0.04 | — | — |
| HAE | 0.31 | 0.29 | 1.37 | 0.015 | 0.0013 | 0.04 | 0.004 | 0.15 | — | — | 0.0037 |
| HAF | 0.29 | 0.14 | 1.16 | 0.011 | 0.0025 | 0.02 | 0.003 | 0.03 | 0.03 | — | 0.0011 |
| HAG | 0.34 | 0.14 | 0.94 | 0.011 | 0.0030 | 0.03 | 0.004 | — | 0.08 | — | 0.0009 |
| HAH | 0.26 | 0.32 | 1.41 | 0.013 | 0.0009 | 0.03 | 0.002 | 0.05 | — | — | 0.0017 |
| HAI | 0.47 | 0.32 | 1.93 | 0.022 | 0.0012 | 0.04 | 0.002 | — | 0.15 | — | — |
| HAJ | 0.29 | 0.25 | 1.37 | 0.013 | 0.0016 | 0.02 | 0.002 | — | 0.03 | — | — |
| HAK | 0.31 | 0.48 | 0.55 | 0.008 | 0.0022 | 0.05 | 0.004 | 0.03 | 0.06 | — | 0.0020 |

| Steel type | Chemical composition (mass %) | | | | | | | | | Remark |
|---|---|---|---|---|---|---|---|---|---|---|
| | Mo | Cr | Ni | Cu | Ca | REM | Mg | Zr | Sb | W | |
| HT | 0.35 | 0.48 | 0.03 | 0.02 | 0.001 | — | 0.003 | — | — | — | Within the range of invention |
| HU | 0.55 | — | — | — | — | — | — | — | 0.0005 | — | Within the range of invention |
| HV | — | 0.67 | — | — | — | — | — | — | — | 0.02 | Within the range of invention |
| HW | 0.42 | — | — | — | — | 0.005 (Nd) | — | — | — | — | Within the range of invention |
| HX | — | 1.64 | 0.02 | — | — | — | — | — | 0.0008 | — | Within the range of invention |
| HY | 0.31 | 0.57 | — | — | 0.001 | — | — | — | 0.0010 | — | Within the range of invention |
| HZ | — | 0.08 | — | — | — | — | 0.003 | — | 0.0006 | — | Within the range of invention |
| HAA | 0.39 | 1.54 | — | 0.04 | — | — | — | — | — | 0.03 | Within the range of invention |
| HAB | 0.05 | 0.34 | — | — | — | 0.002 (Y) 0.004 (Nd) | — | — | — | — | Within the range of invention |
| HAC | 0.31 | — | 0.01 | — | — | — | — | 0.002 | 0.0019 | — | Within the range of invention |
| HAD | 0.42 | 0.71 | — | — | 0.002 | — | 0.003 | — | 0.0013 | — | Within the range of invention |
| HAE | — | — | — | 0.10 | — | — | — | 0.001 | 0.0024 | — | Within the range of invention |
| HAF | 0.33 | 0.12 | 0.03 | — | — | — | 0.003 | — | — | 0.01 | Within the range of invention |
| HAG | — | 1.52 | — | — | 0.003 | 0.006 (Nd) | 0.003 | 0.002 | — | — | Within the range of invention |
| HAH | — | 0.40 | 0.03 | — | — | 0.002 (Nd) | 0.003 | — | — | 0.02 | Within the range of invention |
| HAI | 0.16 | 0.37 | — | 0.05 | — | 0.002 (Ce) | 0.003 | — | 0.0009 | — | Within the range of invention |
| HAJ | — | 0.52 | 0.04 | 0.02 | 0.001 | — | — | 0.002 | — | 0.09 | Within the range of invention |
| HAK | 0.61 | 0.29 | 0.05 | 0.03 | 0.008 | 0.004 (Nd) | 0.003 | — | 0.0016 | — | Within the range of invention |

TABLE 6-1

| Sample No. | Steel type | Product type | Heating temperature of steel (° C.) | Finishing temperature (° C.) | Working ratio from 950° C. to finishing temperature (%) | Cooling rate (° C./sec) | Reheating temperature (° C.) | Holding time (second) |
|---|---|---|---|---|---|---|---|---|
| H1  | HA | Steel plate | 1200 | 910 | 12 | 15 | 580 | 3600 |
| H2  | HA | Steel plate | 1050 | 910 | 12 | 15 | 580 | 3600 |
| H3  | HB | Steel plate | 1150 | 900 | 15 | 20 | 620 | 2700 |
| H4  | HB | Steel plate | 1150 | 750 | 15 | 20 | 620 | 2700 |
| H5  | HC | Steel plate | 1250 | 880 | 10 | 10 | 650 | 1800 |
| H6  | HC | Steel plate | 1250 | 880 | 10 | 0.1 | 650 | 1800 |
| H7  | HD | Steel plate | 1230 | 850 | 5 | 15 | 600 | 2100 |
| H8  | HD | Steel plate | 1230 | 850 | 5 | 15 | 350 | 2100 |
| H9  | HD | Steel plate | 1230 | 850 | 5 | 15 | 800 | 2100 |
| H10 | HE | Steel plate | 1280 | 900 | 8 | 10 | 700 | 1800 |
| H11 | HE | Steel plate | 1280 | 900 | 8 | 10 | 700 | 30 |
| H12 | HF | Steel plate | 1200 | 870 | 12 | 12 | 680 | 2400 |
| H13 | HG | Steel plate | 1300 | 880 | 17 | 30 | 700 | 600 |
| H14 | HH | Steel plate | 1200 | 900 | 10 | 50 | 630 | 1800 |
| H15 | HI | Steel plate | 1180 | 920 | 3 | 100 | 580 | 1800 |
| H16 | HJ | Steel plate | 1230 | 890 | 5 | 70 | 600 | 2400 |
| H17 | HK | Steel plate | 1250 | 920 | 7 | 50 | 730 | 300 |
| H18 | HL | Steel plate | 1250 | 900 | 15 | 100 | 500 | 5400 |
| H19 | HM | Steel plate | 1200 | 870 | 10 | 30 | 640 | 1800 |
| H20 | HN | Steel plate | 1220 | 900 | 10 | 50 | 620 | 1800 |
| H21 | HO | Steel plate | 1200 | 900 | 15 | 30 | 620 | 2400 |
| H22 | HP | Steel plate | 1220 | 880 | 10 | 10 | 550 | 2400 |

| Sample No. | TS (MPa) | Volume fraction of tempered martensite (%) | Average diameter of precipitate (nm) | Density of precipitate (particles/μm²) | Grain diameter of prior gamma in microstructure (μm) | $C/10^{-11}$ | $da/dN/10^{-6}$ (m/cycle) | Remark |
|---|---|---|---|---|---|---|---|---|
| H1  | 954  | 100 | 8  | 150 | 10.9 | 6.6  | 0.69 | Invention example |
| H2  | 910  | 100 | 8  | 10  | 8.3  | 13.9 | 1.43 | Comparative example |
| H3  | 983  | 100 | 13 | 124 | 10.6 | 7.0  | 0.72 | Invention example |
| H4  | 992  | 92  | 13 | 117 | 2.3  | 24.2 | 2.50 | Comparative example |
| H5  | 961  | 100 | 17 | 113 | 10.3 | 7.1  | 0.74 | Invention example |
| H6  | 721  | 71  | 16 | 108 | 11.0 | 9.0  | 1.05 | Comparative example |
| H7  | 996  | 100 | 12 | 115 | 9.6  | 7.6  | 0.79 | Invention example |
| H8  | 1152 | 100 | 4  | 12  | 9.4  | 71.9 | 7.38 | Comparative example |
| H9  | 1054 | 52  | 20 | 82  | 9.2  | 63.3 | 6.37 | Comparative example |
| H10 | 1004 | 100 | 16 | 128 | 7.2  | 7.9  | 0.81 | Invention example |
| H11 | 1157 | 100 | 5  | 20  | 7.5  | 42.2 | 4.33 | Comparative example |
| H12 | 1035 | 99  | 16 | 121 | 6.3  | 7.8  | 0.83 | Invention example |
| H13 | 1051 | 98  | 18 | 132 | 5.2  | 7.9  | 0.84 | Invention example |
| H14 | 994  | 99  | 14 | 128 | 10.4 | 6.9  | 0.74 | Invention example |
| H15 | 1011 | 100 | 10 | 143 | 10.2 | 7.3  | 0.76 | Invention example |
| H16 | 972  | 100 | 12 | 131 | 7.6  | 7.7  | 0.84 | Invention example |
| H17 | 993  | 100 | 22 | 103 | 6.0  | 7.6  | 0.82 | Invention example |
| H18 | 983  | 100 | 6  | 64  | 12.6 | 7.7  | 0.83 | Invention example |
| H19 | 841  | 100 | 14 | 115 | 13.7 | 5.0  | 0.64 | Invention example |
| H20 | 928  | 90  | 13 | 119 | 7.2  | 22.8 | 2.43 | Comparative example |
| H21 | 954  | 100 | 12 | 123 | 10.3 | 38.3 | 3.97 | Comparative example |
| H22 | 943  | 100 | 8  | 142 | 12.4 | 33.2 | 3.56 | Comparative example |

Note)
"Density of precipitate" refers to the density of the particles of precipitate having a diameter of 100 nm or less which include one or more elements selected from Ti, Nb, and V and one or more elements selected from carbon and nitrogen.

TABLE 6-2

| Sample No. | Steel type | Product type | Heating temperature of steel (° C.) | Finishing temperature (° C.) | Working ratio from 950° C. to finishing temperature (%) | Cooling rate (° C./sec) | Reheating temperature (° C.) | Holding time (second) |
|---|---|---|---|---|---|---|---|---|
| H23 | HQ | Steel plate | 1180 | 910 | 12 | 30 | 550 | 1800 |
| H24 | HR | Steel plate | 1160 | 920 | 15 | 50 | 590 | 2400 |
| H25 | HS | Steel plate | 1150 | 900 | 15 | 70 | 550 | 2400 |
| H26 | HT | Steel plate | 1200 | 880 | 10 | 30 | 600 | 3600 |
| H27 | HU | Steel plate | 1210 | 900 | 12 | 15 | 550 | 3600 |
| H28 | HV | Steel plate | 1190 | 880 | 12 | 30 | 590 | 7200 |
| H29 | HW | Steel plate | 1210 | 900 | 15 | 40 | 590 | 2400 |
| H30 | HX | Steel plate | 1230 | 920 | 10 | 50 | 560 | 3000 |
| H31 | HY | Steel plate | 1250 | 930 | 15 | 40 | 560 | 1800 |
| H32 | HZ | Steel plate | 1180 | 900 | 10 | 60 | 520 | 2400 |
| H33 | HAA | Steel plate | 1180 | 920 | 7 | 50 | 590 | 3600 |
| H34 | HAB | Steel plate | 1250 | 910 | 15 | 40 | 620 | 3600 |
| H35 | HAC | Steel plate | 1220 | 900 | 12 | 30 | 600 | 2100 |
| H36 | HAD | Steel plate | 1200 | 930 | 12 | 30 | 600 | 1800 |
| H37 | HAE | Steel plate | 1230 | 910 | 7 | 30 | 570 | 2400 |
| H38 | HAF | Steel plate | 1200 | 890 | 7 | 50 | 550 | 3600 |
| H39 | HAG | Steel plate | 1250 | 880 | 5 | 30 | 590 | 2400 |
| H40 | HAH | Steel plate | 1200 | 900 | 15 | 20 | 550 | 1800 |
| H41 | HAI | Steel plate | 1180 | 900 | 12 | 50 | 670 | 2400 |
| H42 | HAJ | Steel plate | 1190 | 880 | 12 | 50 | 560 | 2400 |
| H43 | HAK | Steel plate | 1150 | 870 | 15 | 40 | 570 | 3600 |

| Sample No. | TS (MPa) | Volume fraction of tempered martensite (%) | Average diameter of precipitate (nm) | Density of precipitate (particles/μm²) | Grain diameter of prior gamma in microstructure (μm) | $C/10^{-11}$ | $da/dN/10^{-6}$ (m/cycle) | Remark |
|---|---|---|---|---|---|---|---|---|
| H23 | 960 | 97 | 8 | 143 | 11.4 | 6.7 | 0.70 | Invention example |
| H24 | 1008 | 100 | 10 | 149 | 10.5 | 6.9 | 0.72 | Invention example |
| H25 | 994 | 100 | 8 | 137 | 10.1 | 7.1 | 0.73 | Invention example |
| H26 | 1006 | 98 | 12 | 109 | 9.2 | 7.1 | 0.72 | Invention example |
| H27 | 1015 | 100 | 7 | 137 | 10.3 | 7.2 | 0.70 | Invention example |
| H28 | 972 | 100 | 9 | 116 | 9.4 | 7.2 | 0.70 | Invention example |
| H29 | 955 | 100 | 8 | 121 | 9.9 | 7.3 | 0.72 | Invention example |
| H30 | 942 | 100 | 7 | 134 | 11.3 | 7.0 | 0.71 | Invention example |
| H31 | 980 | 100 | 9 | 139 | 12.6 | 6.9 | 0.71 | Invention example |
| H32 | 960 | 100 | 6 | 82 | 11.7 | 7.7 | 0.79 | Invention example |
| H33 | 937 | 97 | 10 | 113 | 11.1 | 7.5 | 0.77 | Invention example |
| H34 | 941 | 100 | 15 | 148 | 12.6 | 6.7 | 0.68 | Invention example |
| H35 | 925 | 100 | 12 | 102 | 10.6 | 7.7 | 0.78 | Invention example |
| H36 | 976 | 100 | 10 | 106 | 12.7 | 7.6 | 0.78 | Invention example |
| H37 | 1003 | 100 | 10 | 129 | 11.4 | 7.0 | 0.72 | Invention example |
| H38 | 1025 | 97 | 8 | 128 | 9.7 | 7.1 | 0.72 | Invention example |
| H39 | 1034 | 95 | 11 | 131 | 8.6 | 7.0 | 0.73 | Invention example |
| H40 | 1058 | 100 | 7 | 110 | 9.7 | 7.5 | 0.79 | Invention example |
| H41 | 926 | 100 | 20 | 99 | 12.7 | 7.7 | 0.83 | Invention example |
| H42 | 964 | 100 | 10 | 101 | 9.0 | 7.6 | 0.83 | Invention example |
| H43 | 972 | 100 | 10 | 137 | 8.3 | 7.1 | 0.72 | Invention example |

Note)
"Density of precipitate" refers to the density of the particles of precipitate having a diameter of 100 nm or less which include one or more elements selected from Ti, Nb, and V and one or more elements selected from carbon and nitrogen.

TABLE 7

| Sample No. | Steel type | Product type | Heating temperature of steel (° C.) | Finishing temperature (° C.) | Working ratio from 950° C. to finishing temperature (%) | Cooling rate (° C./sec) | Reheating temperature (° C.) | Holding time (second) |
|---|---|---|---|---|---|---|---|---|
| H44 | HA | Steel pipe | 1210 | 900 | 11 | 12 | 570 | 3600 |
| H45 | HA | Steel pipe | <u>1050</u> | 900 | 11 | 12 | 570 | 3600 |
| H46 | HB | Steel pipe | 1170 | 890 | 14 | 18 | 600 | 2400 |
| H47 | HB | Steel pipe | 1170 | <u>740</u> | 14 | 18 | 600 | 2400 |
| H48 | HC | Steel pipe | 1230 | 870 | 10 | 8 | 630 | 2000 |
| H49 | HC | Steel pipe | 1230 | 870 | 10 | <u>0.2</u> | 630 | 2000 |
| H50 | HD | Steel pipe | 1220 | 840 | 6 | 15 | 600 | 2200 |
| H51 | HD | Steel pipe | 1220 | 840 | 6 | 15 | <u>340</u> | 2200 |
| H52 | HD | Steel pipe | 1220 | 840 | 6 | 15 | <u>780</u> | 2200 |
| H53 | HE | Steel pipe | 1280 | 890 | 8 | 10 | 700 | 1800 |
| H54 | HE | Steel pipe | 1280 | 890 | 8 | 10 | 700 | <u>30</u> |

TABLE 7-continued

| Sample No. | Steel type | Product type | | | | | | |
|---|---|---|---|---|---|---|---|---|
| H55 | HF | Steel pipe | 1200 | 870 | 10 | 12 | 680 | 2400 |
| H56 | HG | Steel pipe | 1300 | 880 | 18 | 25 | 680 | 900 |
| H57 | HH | Steel pipe | 1220 | 910 | 12 | 40 | 630 | 1500 |
| H58 | HI | Steel pipe | 1170 | 920 | 3 | 100 | 580 | 1800 |
| H59 | HJ | Steel pipe | 1230 | 880 | 5 | 75 | 600 | 2400 |
| H60 | HK | Steel pipe | 1250 | 920 | 7 | 50 | 730 | 600 |
| H61 | HL | Steel pipe | 1230 | 900 | 14 | 100 | 500 | 5400 |
| H62 | HM | Steel pipe | 1190 | 880 | 10 | 30 | 640 | 1800 |
| H63 | HN | Steel pipe | 1220 | 920 | 12 | 60 | 620 | 1800 |
| H64 | HO | Steel pipe | 1180 | 910 | 15 | 20 | 620 | 2400 |
| H65 | HP | Steel pipe | 1220 | 880 | 8 | 15 | 550 | 2400 |

| Sample No. | TS (MPa) | Volume fraction of tempered martensite (%) | Average diameter of precipitate (nm) | Density of precipitate (particles/μm²) | Grain diameter of prior gamma in microstructure (μm) | $C/10^{-11}$ | $da/dN/10^{-6}$ (m/cycle) | Remark |
|---|---|---|---|---|---|---|---|---|
| H44 | 956 | 100 | 8 | 153 | 11.0 | 6.4 | 0.68 | Invention example |
| H45 | 915 | 100 | 8 | 14 | 8.5 | 13.8 | 1.41 | Comparative example |
| H46 | 987 | 100 | 12 | 126 | 10.8 | 6.9 | 0.72 | Invention example |
| H47 | 998 | 90 | 12 | 121 | 2.4 | 23.9 | 2.49 | Comparative example |
| H48 | 964 | 100 | 17 | 119 | 10.6 | 7.2 | 0.72 | Invention example |
| H49 | 725 | 75 | 15 | 113 | 10.8 | 10 | 1.04 | Comparative example |
| H50 | 1001 | 100 | 12 | 118 | 9.3 | 7.7 | 0.79 | Invention example |
| H51 | 1158 | 100 | 10 | 12 | 9.2 | 71.7 | 7.38 | Comparative example |
| H52 | 1062 | 47 | 17 | 88 | 9.1 | 63.2 | 6.34 | Comparative example |
| H53 | 1008 | 100 | 15 | 134 | 7.5 | 7.6 | 0.82 | Invention example |
| H54 | 1155 | 100 | 5 | 20 | 7.7 | 42.2 | 4.32 | Comparative example |
| H55 | 1039 | 98 | 14 | 119 | 6.5 | 7.8 | 0.81 | Invention example |
| H56 | 1057 | 99 | 15 | 136 | 5.1 | 7.9 | 0.84 | Invention example |
| H57 | 989 | 97 | 12 | 124 | 10.4 | 7.4 | 0.78 | Invention example |
| H58 | 1013 | 100 | 10 | 145 | 10.3 | 7.2 | 0.74 | Invention example |
| H59 | 972 | 100 | 14 | 133 | 7.8 | 7.7 | 0.83 | Invention example |
| H60 | 998 | 100 | 25 | 106 | 6.1 | 7.9 | 0.86 | Invention example |
| H61 | 986 | 100 | 8 | 65 | 12.6 | 7.8 | 0.83 | Invention example |
| H62 | 835 | 100 | 14 | 111 | 14 | 5.2 | 0.66 | Invention example |
| H63 | 932 | 87 | 12 | 122 | 7.0 | 22.8 | 2.44 | Comparative example |
| H64 | 957 | 100 | 10 | 127 | 10.4 | 38.7 | 3.95 | Comparative example |
| H65 | 945 | 100 | 8 | 145 | 12.6 | 33.3 | 3.55 | Comparative example |

Note)
"Density of precipitate" refers to the density of the particles of precipitate having a diameter of 100 nm or less which include one or more elements selected from Ti, Nb, and V and one or more elements selected from carbon and nitrogen.

TABLE 8

| Sample No. | Steel type | Product type | Initial grain diameter of steel material (μm) | Heating temperature of steel material or container (° C.) | Holding time (heating time) (second) | Cooling rate (° C./sec) | Cooling termination temperature (° C.) | Reheating temperature (° C.) | Holding time (during reheating) (second) |
|---|---|---|---|---|---|---|---|---|---|
| H66 | HA | Steel plate | 6 | 900 | 60 | 12 | 40 | 570 | 3600 |
| H67 | HA | Steel plate | 2.3 | 900 | 600 | 12 | 40 | 570 | 3600 |
| H68 | HB | Steel pipe | 7.5 | 890 | 1800 | 18 | 30 | 600 | 2400 |
| H69 | HB | Steel pipe | 7.5 | 740 | 1800 | 18 | 30 | 600 | 2400 |
| H70 | HC | Container | 8.2 | 870 | 1200 | 8 | 80 | 630 | 2000 |
| H71 | HC | Container | 8.2 | 870 | 1200 | 0.2 | 80 | 630 | 2000 |
| H72 | HD | Steel plate | 4.8 | 840 | 3600 | 15 | 30 | 600 | 2200 |
| H73 | HD | Steel plate | 4.8 | 840 | 3600 | 15 | 30 | 340 | 2200 |

TABLE 8-continued

| | | | | | | | | |
|---|---|---|---|---|---|---|---|---|
| H74 | HE | Steel pipe | 6.5 | 890 | 2400 | 10 | 100 | <u>780</u> | 1800 |
| H75 | HE | Steel pipe | 6.5 | 890 | 2400 | 10 | 100 | 700 | 1800 |
| H76 | HE | Steel pipe | 6.5 | 890 | 2400 | 10 | 100 | 700 | <u>30</u> |
| H77 | HF | Container | 10.7 | 870 | 300 | 12 | 25 | 680 | 2400 |
| H78 | HF | Container | 10.7 | 870 | 300 | 12 | <u>420</u> | 680 | 2400 |
| H79 | HG | Steel plate | 9.1 | 910 | 900 | 40 | 180 | 630 | 1500 |
| H80 | HH | Steel pipe | 9.1 | 920 | 1800 | 100 | 20 | 580 | 1800 |
| H81 | HI | Container | 11.1 | 880 | 1500 | 75 | 25 | 600 | 2400 |
| H82 | HJ | Steel plate | 7.8 | 920 | 1800 | 50 | 250 | 730 | 600 |
| H83 | HK | Steel pipe | 4.3 | 900 | 600 | 100 | 25 | 500 | 5400 |
| H84 | HL | Container | 6.2 | 880 | 3600 | 30 | 40 | 640 | 1800 |
| H85 | HM | Steel plate | 5.7 | 920 | 1800 | 60 | 50 | 620 | 1800 |
| H86 | <u>HN</u> | Steel pipe | 9.2 | 910 | 1800 | 20 | 30 | 620 | 2400 |
| H87 | <u>HO</u> | Container | 8.4 | 880 | 1800 | 15 | 50 | 550 | 2400 |
| H88 | <u>HP</u> | Steel pipe | 10.9 | 880 | 1800 | 15 | 25 | 550 | 2400 |

| Sample No. | TS (MPa) | Volume fraction of tempered martensite (%) | Average diameter of precipitate (nm) | Density of precipitate (particles/ μm²) | Grain diameter of prior gamma in microstructure (μm) | $C/10^{-11}$ | da/dN/ $10^{-6}$ (m/cycle) | Remark |
|---|---|---|---|---|---|---|---|---|
| H66 | 956 | 100 | 9 | 149 | 11.4 | 6.4 | 0.68 | Invention example |
| H67 | 915 | 100 | 9 | <u>11</u> | 8.7 | 13.8 | 1.41 | Comparative example |
| H68 | 987 | 100 | 13 | 121 | 11.8 | 6.9 | 0.72 | Invention example |
| H69 | 998 | <u>90</u> | 13 | 114 | <u>2.4</u> | 23.9 | 2.49 | Comparative example |
| H70 | 964 | 100 | 15 | 115 | 11.4 | 7.2 | 0.72 | Invention example |
| H71 | 725 | <u>75</u> | 16 | 107 | 11.8 | 10 | 1.04 | Comparative example |
| H72 | 1001 | 100 | 13 | 117 | 10.6 | 7.7 | 0.79 | Invention example |
| H73 | 1158 | 100 | 9 | <u>9</u> | 9.8 | 71.7 | 7.38 | Comparative example |
| H74 | 1062 | <u>47</u> | 15 | 88 | 10.1 | 63.2 | 6.34 | Comparative example |
| H75 | 1008 | 100 | 14 | 124 | 8.6 | 7.6 | 0.82 | Invention example |
| H76 | 1155 | 100 | 7 | <u>12</u> | 8.6 | 42.2 | 4.32 | Comparative example |
| H77 | 1039 | 98 | 13 | 115 | 7.2 | 7.9 | 0.81 | Invention example |
| H78 | 863 | <u>64</u> | 23 | <u>34</u> | 6.2 | 8.8 | 0.97 | Comparative example |
| H79 | 989 | 97 | 13 | 128 | 10.8 | 7.6 | 0.78 | Invention example |
| H80 | 1013 | 100 | 11 | 139 | 9.6 | 7.3 | 0.74 | Invention example |
| H81 | 972 | 100 | 15 | 136 | 9.1 | 6.8 | 0.72 | Invention example |
| H82 | 998 | 100 | 25 | 111 | 7.2 | 7.6 | 0.82 | Invention example |
| H83 | 986 | 100 | 10 | 59 | 13.5 | 7.8 | 0.85 | Invention example |
| H84 | 965 | 100 | 13 | 108 | 14.5 | 5.2 | 0.66 | Invention example |
| H85 | 835 | 97 | 10 | 117 | 7.8 | 5.3 | 0.71 | Invention example |
| H86 | 957 | 100 | 9 | 125 | 10.7 | 38.7 | 3.95 | Comparative example |

TABLE 8-continued

| | | | | | | | | |
|---|---|---|---|---|---|---|---|---|
| H87 | 945 | 100 | 9 | 146 | 13.3 | 33.3 | 3.55 | Comparative example |
| H88 | 945 | 100 | 8 | 140 | 13.0 | 33.3 | 3.55 | Comparative example |

Note 1)
"Initial grain diameter of steel material" refers to an average grain diameter observed in a microstructure obtained by saturated picric acid etching.

Note 2) "Density of precipitate" refers to the density of the particles of precipitate having a diameter of 100 nm or less which include one or more elements selected from Ti, Nb, and V and one or more elements selected from carbon and nitrogen.

The invention claimed is:

1. A steel material comprising: a composition containing, by mass, C: 0.05% to 0.60%, Si: 0.01% to 2.0%, Mn: 0.3% to 3.0%, P: 0.001% to 0.040%, S: 0.0001% to 0.010%, N: 0.0001% to 0.0060%, Al: 0.01% to 1.5%, one or more elements selected from Ti: 0.010% to 0.20%, Nb: 0.01% to 0.20%, and V: 0.01% or more and less than 0.05%, and one or more elements selected from B: 0.0001% to 0.01%, Mo: 0.005% to 2.0%, and Cr: 0.005% to 3.0%, with the balance being Fe and inevitable impurities;

and a steel microstructure
that includes 95% or more of tempered martensite on a volume fraction basis,
that includes a precipitate having a diameter of 100 nm or less and including one or more elements selected from Ti, Nb, and V and one or more elements selected from carbon and nitrogen at a density of 50 particles/$\mu m^2$ or more,
and that includes prior austenite having a grain diameter of 3 μm or more.

2. The steel material according to claim 1, the steel material comprising, by mass, C: 0.05% or more and less than 0.21%.

3. The steel material according to claim 1, the steel material comprising, by mass, C: 0.21% to 0.60%.

4. The steel material according to claim 1, the steel material comprising a composition further containing at least one group selected from the groups A to E consisting of:
Group A: one or more elements selected from Ni: 0.005% to 0.70% and Cu: 0.005% to 2.00% by mass
Group B: one or more elements selected from Ca: 0.001% to 0.01% and REM: 0.001% to 0.01% by mass
Group C: one or more elements selected from Mg: 0.001% to 0.01% and Zr: 0.001% to 0.01% by mass
Group D: Sb: 0.0001% to 0.1% by mass
Group E: W: 0.001% to 1% by mass.

5. The steel material according to claim 2, the steel material comprising a composition further containing at least one group selected from the groups A to E consisting of:
Group A: one or more elements selected from Ni: 0.005% to 0.70% and Cu: 0.005% to 2.00% by mass
Group B: one or more elements selected from Ca: 0.001% to 0.01% and REM: 0.001% to 0.01% by mass
Group C: one or more elements selected from Mg: 0.001% to 0.01% and Zr: 0.001% to 0.01% by mass
Group D: Sb: 0.0001% to 0.1% by mass
Group E: W: 0.001% to 1% by mass.

6. The steel material according to claim 3, the steel material comprising a composition further containing at least one group selected from the groups A to E consisting of:
Group A: one or more elements selected from Ni: 0.005% to 0.70% and Cu: 0.005% to 2.00% by mass
Group B: one or more elements selected from Ca: 0.001% to 0.01% and REM: 0.001% to 0.01% by mass
Group C: one or more elements selected from Mg: 0.001% to 0.01% and Zr: 0.001% to 0.01% by mass
Group D: Sb: 0.0001% to 0.1% by mass
Group E: W: 0.001% to 1% by mass.

7. A method for producing a steel material having a steel microstructure
that includes 95% or more of tempered martensite on a volume fraction basis,
that includes a precipitate having a diameter of 100 nm or less and including one or more elements selected from Ti, Nb, and V and one or more elements selected from carbon and nitrogen at a density of 50 particles/$\mu m^2$ or more,
and that includes prior austenite having a grain diameter of 3 μm or more,
the method comprising: heating a steel having the composition according to any one of claims 1 to 6 to 1100° C. or more; performing working in such a manner that a working ratio from 950° C. to a finishing temperature is 20% or less, the finishing temperature being 800° C. or more; performing cooling to 350° C. or less at a cooling rate of 1° C./sec. or more; performing heating to 400° C. or more and 750° C. or less, followed by holding for 60 seconds or more; and performing cooling.

8. A method for producing a steel material having a steel microstructure
that includes 95% or more of tempered martensite on a volume fraction basis,
that includes a precipitate having a diameter of 100 nm or less and including one or more elements selected from Ti, Nb, and V and one or more elements selected from carbon and nitrogen at a density of 50 particles/$\mu m^2$ or more,
and that includes prior austenite having a grain diameter of 3 nm or more,
the method comprising: heating a steel material having the composition according to any one of claims 1 to 6 to 800° C. or more, performing saturated picric acid etching, followed by holding for 60 seconds or more; performing cooling to 350° C. or less at a cooling rate of 1° C./sec. or more; performing heating to 400° C. or more and 750° C. or less, followed by holding for 60 seconds or more; and performing cooling.

* * * * *